United States Patent
Lou et al.

(10) Patent No.: US 11,218,196 B2
(45) Date of Patent: Jan. 4, 2022

(54) COMMUNICATION OF HIGH EFFICIENCY (HE) LONG TRAINING FIELDS (LTFS) IN A WIRELESS LOCAL AREA NETWORK (WLAN)

(71) Applicant: InterDigital Patent Holdings, Inc., Wilmington, DE (US)

(72) Inventors: Hanqing Lou, Syosset, NY (US); Oghenekome Oteri, San Diego, CA (US); Pengfei Xia, San Diego, CA (US); Robert L Olesen, Huntington, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 51 days.

(21) Appl. No.: 15/510,383

(22) PCT Filed: Sep. 11, 2015

(86) PCT No.: PCT/US2015/049653
§ 371 (c)(1),
(2) Date: Mar. 10, 2017

(87) PCT Pub. No.: WO2016/040782
PCT Pub. Date: Mar. 17, 2016

(65) Prior Publication Data
US 2017/0288748 A1    Oct. 5, 2017

Related U.S. Application Data

(60) Provisional application No. 62/049,978, filed on Sep. 12, 2014.

(51) Int. Cl.
*H04L 27/26* (2006.01)
*H04B 7/0452* (2017.01)
(Continued)

(52) U.S. Cl.
CPC ........ *H04B 7/0452* (2013.01); *H04B 7/0617* (2013.01); *H04L 5/0094* (2013.01);
(Continued)

(58) Field of Classification Search
CPC ........... H04L 27/2666; H04L 29/06476; H04L 65/4069; H04N 21/643; H04W 84/12
See application file for complete search history.

(56) References Cited

U.S. PATENT DOCUMENTS 8,000,407 B2   8/2011  Prakash
8,913,569 B2   12/2014 Castelain et al.
(Continued)

FOREIGN PATENT DOCUMENTS

EP    2609710 B1     2/2019
WO    2010095802 A1  8/2010
WO    2015/009846    1/2015

OTHER PUBLICATIONS

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6GHz, IEEE P802.11ac/D2.0 (Jan. 2012).

(Continued)

*Primary Examiner* — Salvador E Rivas
(74) *Attorney, Agent, or Firm* — Volpe Koenig

(57) ABSTRACT

A mobile station may determine streams associated with a high efficiency (HE) wireless local area network (WLAN) communication. A number of symbols related to the streams may be utilized for HE long training field (LTF) communication.

8 Claims, 18 Drawing Sheets

(51) Int. Cl.
*H04B 7/06* (2006.01)
*H04L 5/00* (2006.01)
*H04W 84/12* (2009.01)

(52) U.S. Cl.
CPC ........ *H04L 27/2666* (2013.01); *H04L 5/0048* (2013.01); *H04W 84/12* (2013.01)

(56) References Cited

U.S. PATENT DOCUMENTS

| | | | |
|---|---|---|---|
| 9,078,245 B2 | 7/2015 | Kim et al. | |
| 2010/0290449 A1 | 11/2010 | van Nee et al. | |
| 2012/0327871 A1 | 12/2012 | Ghosh et al. | |
| 2013/0229996 A1 | 9/2013 | Wang et al. | |
| 2013/0286959 A1 | 10/2013 | Lou et al. | |
| 2013/0301551 A1 | 11/2013 | Ghosh et al. | |
| 2014/0086169 A1 | 3/2014 | Bao et al. | |
| 2014/0307650 A1* | 10/2014 | Vermani | H04L 5/0094 370/329 |
| 2014/0328265 A1* | 11/2014 | Sampath | H04W 72/082 370/329 |
| 2016/0211961 A1* | 7/2016 | Azizi | H04L 5/0048 |
| 2016/0255656 A1 | 9/2016 | Lou et al. | |
| 2017/0026952 A1* | 1/2017 | Park | H04L 5/00 |
| 2017/0201357 A1* | 7/2017 | Choi | H04L 27/2605 |

OTHER PUBLICATIONS

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 6: Sub 1 GHz License Exempt Operation, IEEE P802.11ah/D2.1 (Aug. 2014).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

IEEE Std. 802.11a-1999(R2003), Supplement to IEEE Standard for Information technology—Telecommunications and information exchange between systems—Local and metropolitan area networks—specific requirements, Part 11: Wireless LAN Medium Access Control (MAC) and Physical Layer (PHY) specifications: High-speed Physical Layer in the 5GHz Band, pp. 1-92 (2003).

IEEE Std. 802.11g-2003, IEEE Standard for Information technology—Telecommunications and information exchange between systems—Local and metropolitan area networks—specific requirements, Part 11: Wireless LAN Medium Access Control (MAC) and Physical Layer (PHY) specifications, Amendment 4: Further Higher Data Rate Extension in the 2.4 GHz Band, pp. 1-78 (Jun. 2003).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

* cited by examiner

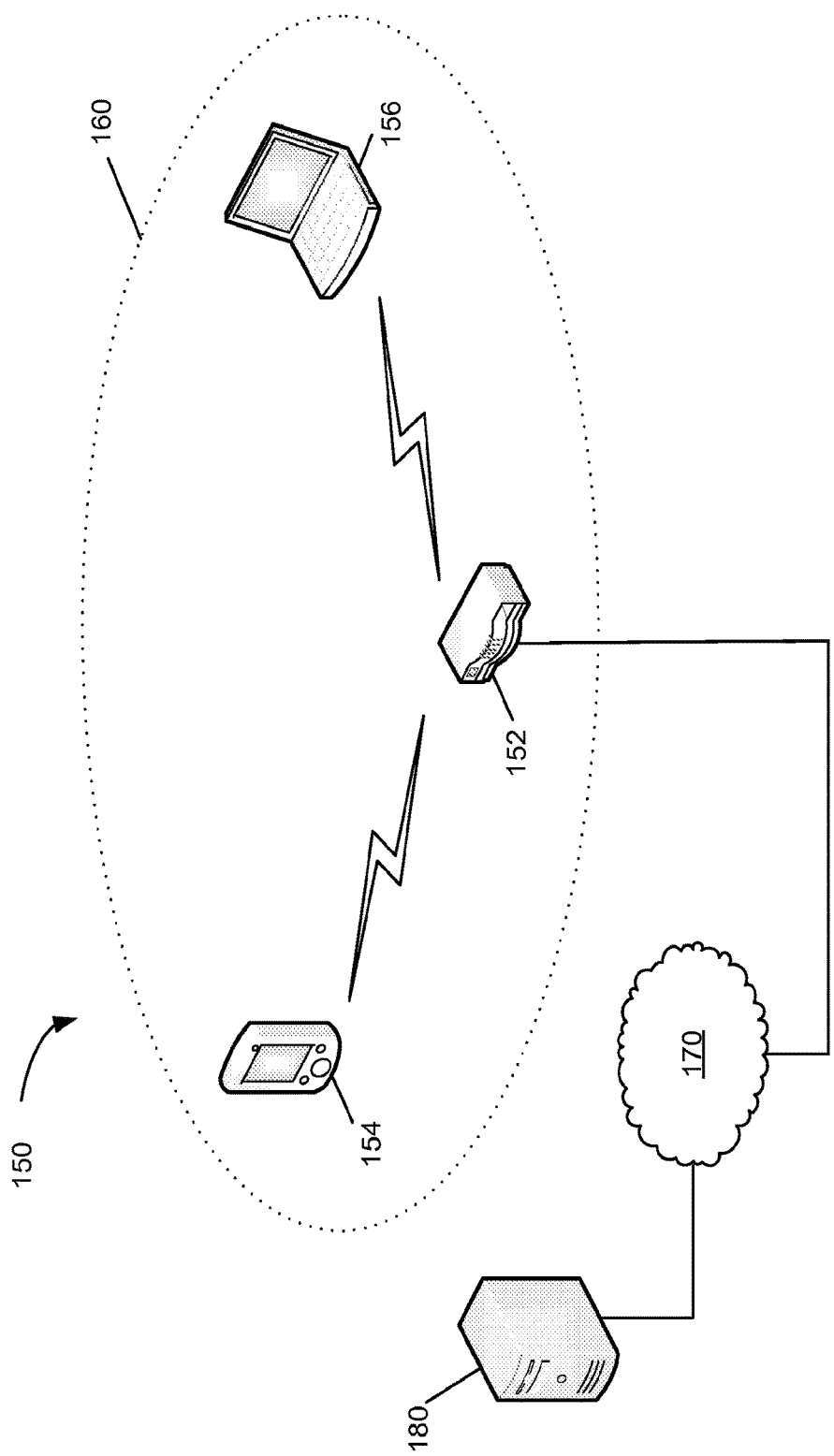

SIG-1 structure

SIG-2 structure

SIG-A-1 structure for SU PPDU

SIG-A-2 structure for SU PPDU

SIG-A-1 structure for MU PPDU

SIG-A-2 structure for MU PPDU

Structure of the 6 symbol SIG field of S1G_1M PPDU

COMMUNICATION OF HIGH EFFICIENCY (HE) LONG TRAINING FIELDS (LTFS) IN A WIRELESS LOCAL AREA NETWORK (WLAN)

CROSS-REFERENCE TO RELATED APPLICATIONS

This application is the National Stage Entry under 35 U.S.C. § 371 Patent Cooperation Treaty Application No. PCT/US2015/049653, filed Sep. 11, 2015, which claims the benefit of U.S. Provisional Application No. 62/049,978, filed Sep. 12, 2014, the disclosure of which is incorporated herein by reference in its entirety.

BACKGROUND

Wireless networks (e.g., IEEE 802.11ac based networks) may provide access points (APs) for one or more stations (STAs) in a basic service set (BSS) with one or more operating channels. The AP may have access or interface to a distribution system (DS) or another type of wired/wireless network that carries traffic in and out of the BSS. Traffic to STAs that originates from outside the BSS may arrive through the AP and be delivered to the STAs. Traffic originating from STAs to destinations outside the BSS may be sent to the AP to be delivered to the respective destinations.

Traffic between STAs within the BSS may be sent through the AP where the source STA sends traffic to the AP and the AP delivers the traffic to the destination STA. Such traffic between STAs within a BSS may be peer-to-peer traffic. Such peer-to-peer traffic may be sent directly between the source and destination STAs, e.g., with a direct link setup (DLS) using an 802.11e DLS or an 802.11z tunneled DLS (TDLS). A WLAN in Independent BSS mode may have no AP and STAs communicate directly with each other.

SUMMARY

Systems, methods, and instrumentalities are provided to determine a physical layer (PHY) protocol data unit (PPDU) format. A determination may be made if a basic service set (BSS) includes a first-type legacy station, wherein the first-type legacy station is a pre-802.11n device. A determination may be made if stations in the BSS support a short format preamble. A determination may be made if beamforming or precoding is to be used in association with an upcoming multi-user transmission. An indication of a selected PPDU preamble format may be sent to a station in the BSS via a multi-user transmission, wherein a long format preamble is selected when the BSS includes the first-type legacy station, beamforming is to be used in association with the upcoming multi-user transmission, or precoding is to be used in association with the upcoming multi-user transmission, and the short format preamble is selected when the BSS does not include the first-type legacy station, beamforming is not to be used in association with the upcoming multi-user transmission, and precoding is not to be used in association with the upcoming multi-user transmission.

BRIEF DESCRIPTION OF THE DRAWINGS

FIG. 1C depicts an exemplary wireless local area network (WLAN).

DETAILED DESCRIPTION

A detailed description of illustrative embodiments is described with reference to the various figures. Although this description provides a detailed example of possible implementations, it should be noted that the details are intended to be exemplary and in no way limit the scope of the application. In addition, the figures may illustrate one or more message charts, which are meant to be exemplary (the messages may be varied, reordered, or even omitted where appropriate).

Figure 1A:
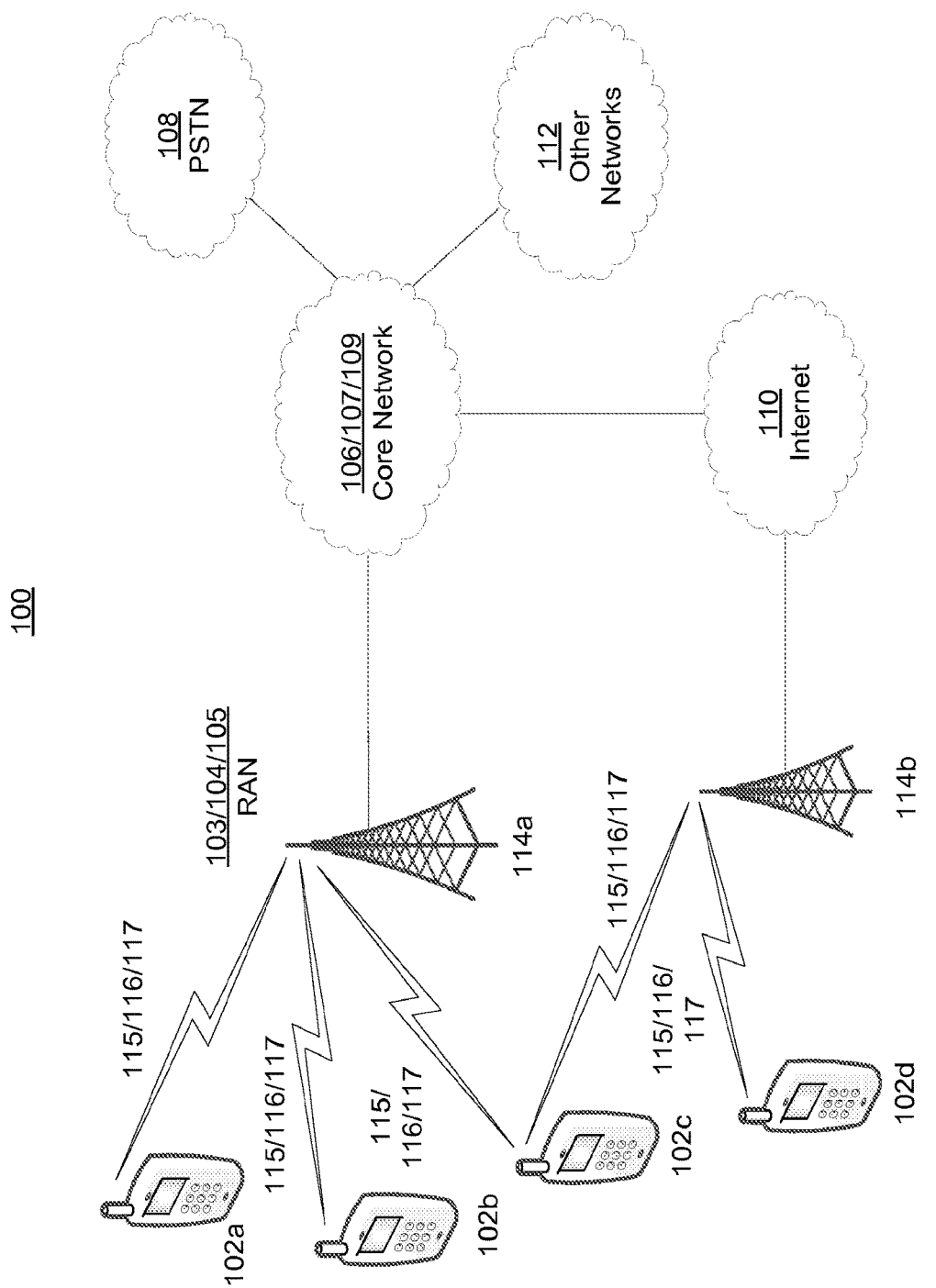
FIG. 1A depicts an exemplary communications system.

FIG. 1A is a diagram of an example communications system 100 in which one or more disclosed features may be implemented. For example, a wireless network (e.g., a wireless network comprising one or more components of the communications system 100) may be configured such that bearers that extend beyond the wireless network (e.g., beyond a walled garden associated with the wireless network) may be assigned QoS characteristics.

The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include at least one wireless transmit/receive unit (WTRU), such as a plurality of WTRUs, for instance WTRUs 102a, 102b, 102c, and 102d, a radio access network (RAN) 104, a core network 106, a public switched telephone network (PSTN) 108, the Internet 110, and other networks 112, though it should be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it should be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it should be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
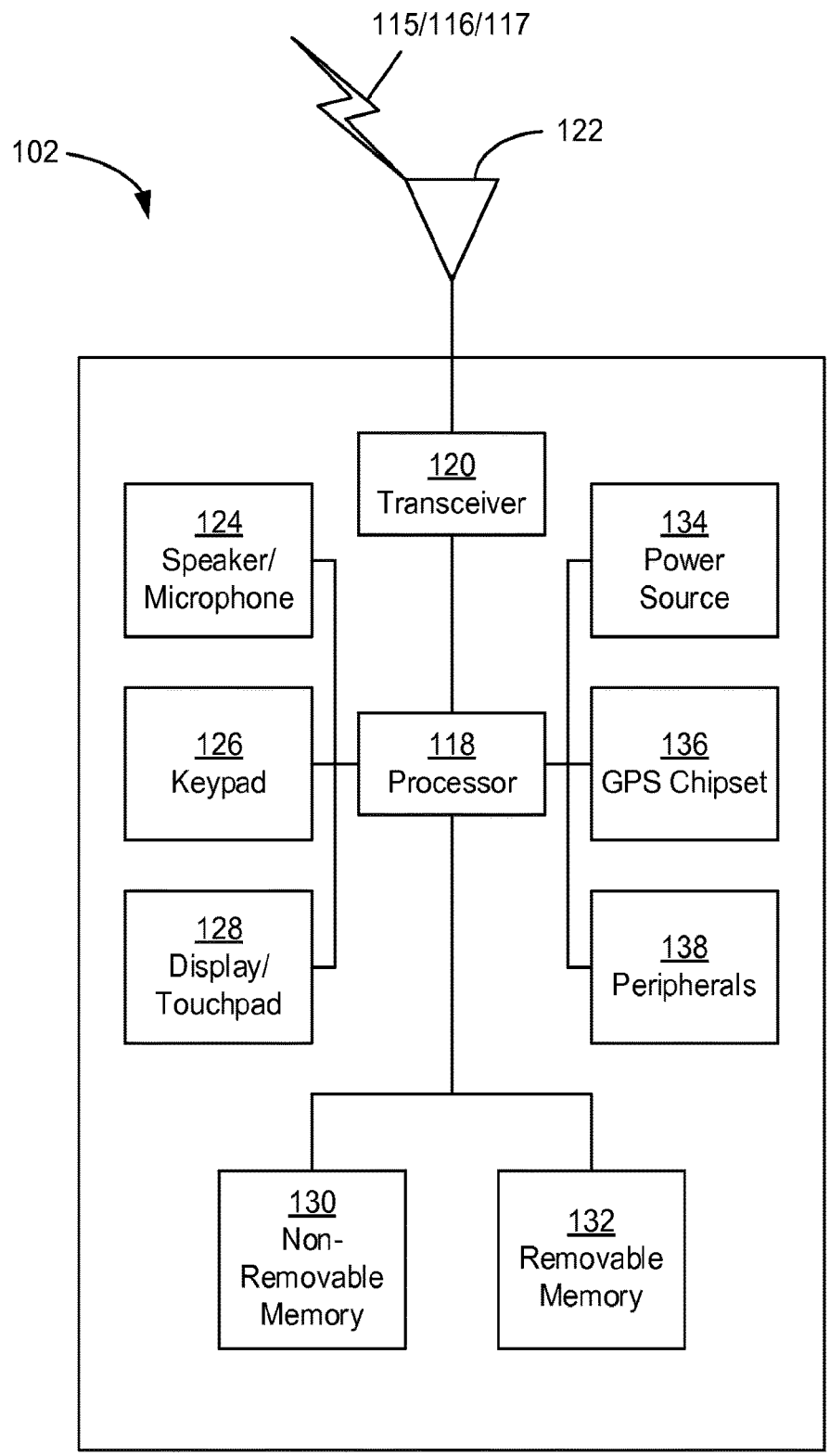
FIG. 1B depicts an exemplary wireless transmit/receive unit (WTRU).

FIG. 1B depicts an exemplary wireless transmit/receive unit, WTRU 102. WTRU 102 may be used in one or more of the communications systems described herein. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It should be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it should be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It should be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It should be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 1C depicts exemplary WLAN devices, one or more of which may be used to implement one or more of the features described herein, operating in a WLAN system 150. The WLAN system 150 may be configured to implement one or more protocols of the IEEE 802.11 communication standard, which may include a channel access scheme, such as DSSS, OFDM, OFDMA, etc. A WLAN may operate in a mode, e.g., an infrastructure mode, an ad-hoc mode, etc.

The WLAN system 150 may include, but is not limited to, an access point (AP) 152, a station (STA) 154, and STA 156. The STA 154 and STA 156 may be associated with the AP 152. A WLAN operating in an infrastructure mode may comprise one or more APs communicating with one or more associated STAs. An AP and STA(s) associated with the AP may comprise a basic service set (BSS). For example, AP 152, STA 154, and STA 156 may comprise BSS 160. An extended service set (ESS) may comprise one or more APs (with one or more BSSs) and STA(s) associated with the APs.

An AP may have access to, and/or interface to, a distribution system (DS), which may be wired and/or wireless and may carry traffic to and/or from the AP. Traffic to a STA in the WLAN originating from outside the WLAN may be received at an AP in the WLAN, which may send the traffic to the STA in the WLAN. Traffic originating from a STA in the WLAN to a destination outside the WLAN may be sent to an AP in the WLAN, which may send the traffic to the destination.

As depicted, the AP 152 is in communication with a network 170. The network 170 is in communication with a server 180. Traffic between STAs within the WLAN may be sent through one or more APs. For example, a source STA (e.g., STA 156) may have traffic intended for a destination STA (e.g., STA 154). STA 156 may send the traffic to AP 152, and, AP 152 may send the traffic to STA 154.

A WLAN may operate in an ad-hoc mode. The ad-hoc mode WLAN may be referred to as independent BSS. In an ad-hoc mode WLAN, the STAs may communicate directly with each other (e.g., STA 154 may communicate with STA 156 without such communication being routed through an AP).

IEEE 802.11 devices (e.g., IEEE 802.11 APs in a BSS) may use beacon frames to announce the existence of a WLAN network. An AP, such as AP 152, may transmit a beacon on a channel, e.g., a fixed channel, such as a primary channel. A STA may use a channel, such as the primary channel, to establish a connection with an AP.

STA(s) and/or AP(s) may use a Carrier Sense Multiple Access with Collision Avoidance (CSMA/CA) channel access mechanism. In CSMA/CA, a STA and/or an AP may sense the primary channel. For example, if a STA has data to send, the STA may sense the primary channel. If the primary channel is detected to be busy, the STA may back off. For example, a WLAN or portion thereof may be configured so that one STA may transmit at a given time, e.g., in a given BSS. Channel access may include RTS and/or CTS signaling. For example, an exchange of a request to send (RTS) frame may be transmitted by a sending device and a clear to send (CTS) frame that may be sent by a receiving device. For example, if an AP has data to send to a STA, the AP may send an RTS frame to the STA. If the STA is ready to receive data, the STA may respond with a CTS frame. The CTS frame may include a time value that may alert other STAs to hold off from accessing the medium while the AP initiating the RTS may transmit its data. On receiving the CTS frame from the STA, the AP may send the data to the STA.

A device may reserve spectrum via a network allocation vector (NAV) field. For example, in an IEEE 802.11 frame, the NAV field may be used to reserve a channel for a time period. A STA that wants to transmit data may set the NAV to the time for which it may expect to use the channel. When a STA sets the NAV, the NAV may be set for an associated WLAN or subset thereof (e.g., a BSS). Other STAs may count down the NAV to zero. When the counter reaches a value of zero, the NAV functionality may indicate to the other STA that the channel is now available.

The devices in a WLAN, such as an AP or STA, may include one or more of the following: a processor, a memory, a radio receiver, and/or transmitter (e.g., which may be combined in a transceiver), one or more antennas, etc. A processor function may comprise one or more processors. For example, the processor may comprise one or more of: a general purpose processor, a special purpose processor (e.g., a baseband processor, a MAC processor, etc.), a digital signal processor (DSP), Application Specific Integrated Circuits (ASICs), Field Programmable Gate Array (FPGAs) circuits, any other type of integrated circuit (IC), a state machine, and the like. The one or more processors may be integrated or not integrated with each other. The processor (e.g., the one or more processors or a subset thereof) may be integrated with one or more other functions (e.g., other functions such as memory). The processor may perform signal coding, data processing, power control, input/output processing, modulation, demodulation, and/or any other functionality that may enable the device to operate in a wireless environment, such as the WLAN of FIG. 1C. The processor may be configured to execute processor executable code (e.g., instructions) including, for example, software and/or firmware instructions. For example, the processer may be configured to execute computer readable instructions included on one or more of the processor (e.g., a chipset that includes memory and a processor) or memory. Execution of the instructions may cause the device to perform one or more of the functions described herein.

A device may include one or more antennas. The device may employ multiple input multiple output (MIMO) techniques. The one or more antennas may receive a radio signal. The processor may receive the radio signal, e.g., via the one or more antennas. The one or more antennas may transmit a radio signal (e.g., based on a signal sent from the processor).

The device may have a memory that may include one or more devices for storing programming and/or data, such as processor executable code or instructions (e.g., software, firmware, etc.), electronic data, databases, or other digital information. The memory may include one or more memory units. One or more memory units may be integrated with one or more other functions (e.g., other functions included in the device, such as the processor). The memory may include a read-only memory (ROM) (e.g., erasable programmable read only memory (EPROM), electrically erasable programmable read only memory (EEPROM), etc.), random access memory (RAM), magnetic disk storage media, optical storage media, flash memory devices, and/or other non-transitory computer-readable media for storing information. The memory may be coupled to the processor. The processor may communicate with one or more entities of memory, e.g., via a system bus, directly, etc.

A WLAN in infrastructure basic service set (BSS) mode may have an access point (AP) for the basic service set and one or more stations (STAs) associated with the AP. The AP may have access or interface to a distribution system (DS) or another type of wired/wireless network that may carry traffic in and out of the BSS. Traffic to STAs may originate from outside the BSS, may arrive through the AP and may be delivered to the STAs. The traffic originating from STAs to destinations outside the BSS may be sent to the AP to be delivered to the respective destinations. Traffic between STAs within the BSS may be sent through the AP where the source STA may sends traffic to the AP and the AP may deliver the traffic to the destination STA. The traffic between STAs within a BSS may be peer-to-peer traffic. Such peer-to-peer traffic may be sent directly between the source and destination STAs, e.g., with a direct link setup (DLS) using an IEEE 802.11e DLS or an IEEE 802.11z tunneled DLS (TDLS). A WLAN using an independent BSS mode may have no APs, and the STAs may communicate directly with each other. This mode of communication may be an ad-hoc mode.

Using the IEEE 802.11 infrastructure mode of operation, the AP may transmit a beacon on a fixed channel, usually the primary channel. This channel may be 20 MHz wide, and may be the operating channel of the BSS. This channel may also be used by the STAs to establish a connection with the AP. The channel access in an IEEE 802.11 system may be Carrier Sense Multiple Access with Collision Avoidance (CSMA/CA). In this mode of operation, the STAs, including the AP, may sense the primary channel. If the channel is detected to be busy, the STA may back off. One STA may transmit at any given time in a given BSS.

Figure 2:
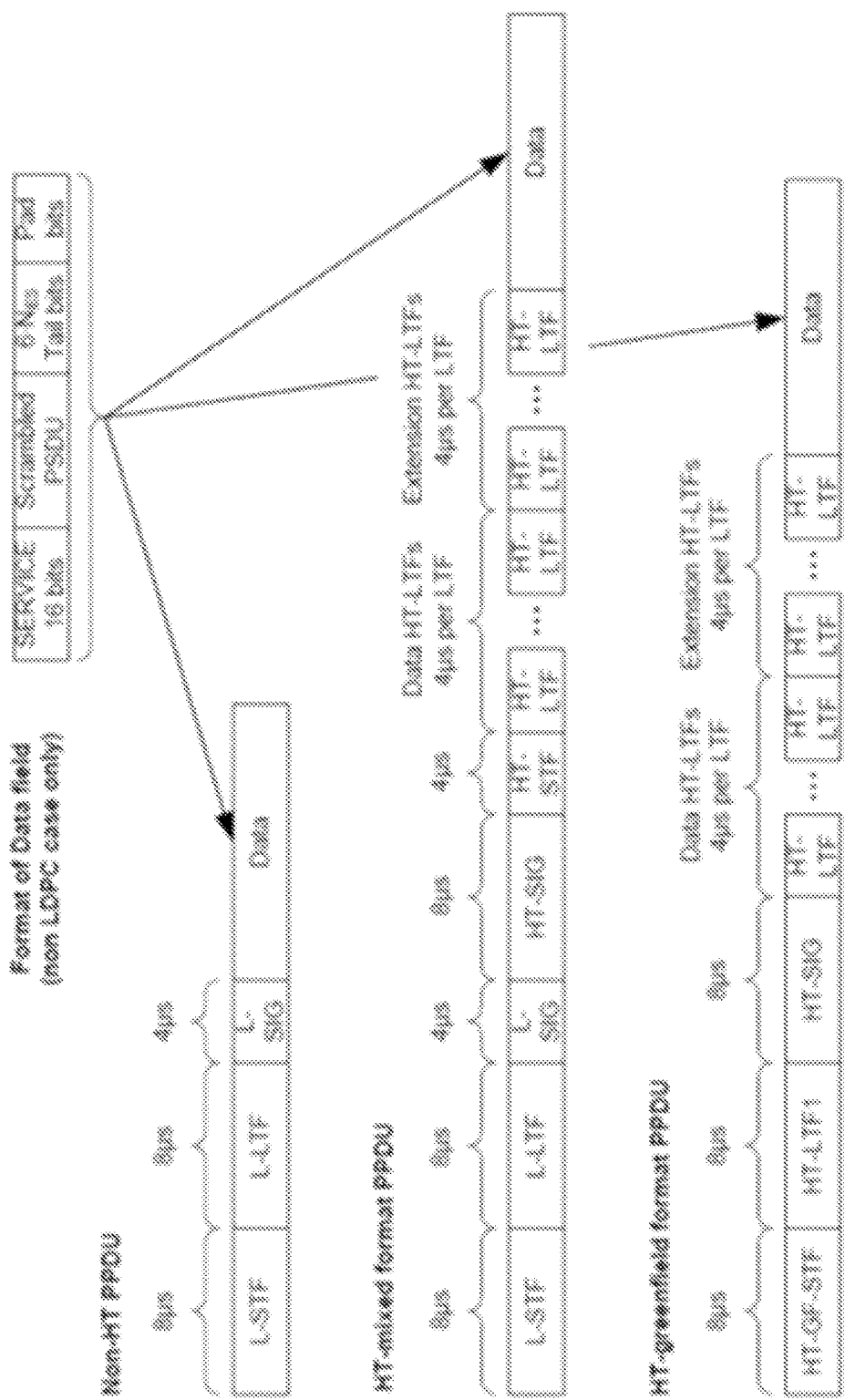
FIG. 2 depicts an example of three physical layer (PHY) protocol data unit (PPDU) formats in 802.11n (High Throughput).

FIG. 2 illustrates that 802.11n (High Throughput) may support three PPDU formats (Non-HT PPDU, HT-mixed format PPDU, and HT-greenfield format PPDU). An 802.11n HT-SIG field is illustrated in Table 1:

TABLE 1

| Field | Number of bits | Explanation and coding |
|---|---|---|
| Modulation and Coding Scheme | 7 | Index into the MCS table. See NOTE 1. |
| CBW 20/40 | 1 | Set to 0 for 20 MHz or 40 MHz upper/lower. Set to 1 for 40 MHz. |
| HT Length | 16 | The number of octets of data in the PSDU in the range of 0 to 65 535. See NOTE 1 and NOTE 2. |
| Smoothing | 1 | Set to 1 indicates that channel estimate smoothing is recommended. Set to 0 indicates that only per-carrier independent (unsmoothed) channel estimate is recommended. See 20.3.11.11.2. |
| Not Sounding | 1 | Set to 0 indicates that PPDU is a sounding PPDU. Set to 1 indicates that the PPDU is not a sounding PPDU. |
| Reserved | 1 | Set to 1. |
| Aggregation | 1 | Set to 1 to indicate that the PPDU in the data portion of the packet contains an A-MPDU; otherwise, set to 0. |
| STBC | 2 | Set to a nonzero number, to indicate the difference between the number of space-time streams ($N_{STS}$) and the number of spatial streams ($N_{SS}$) indicated by the MCS. Set to 00 to indicate no STBC ($N_{STS} = N_{SS}$). See NOTE 1. |
| FEC coding | 1 | Set to 1 for LDPC. Set to 0 for BCC. |
| Short GI | 1 | Set to 1 to indicate that the short GI is used after the HT training. Set to 0 otherwise. |
| Number of extension spatial streams | 2 | Indicates the number of extension spatial streams ($N_{ESS}$). Set to 0 for no extension spatial streams. Set to 1 for 1 extension spatial streams. Set to 2 for 2 extension spatial streams. Set to 3 for 3 extension spatial streams. See NOTE 1. |
| CRC | 8 | CRC of bits 0-23 in HT-SIG$_1$ and bits 0-9 in HT-SIG$_2$. See 20.3.9.4.4. The first bit to be transmitted is bit C7 as explained in 20.3.9.4.4. |
| Tail Bits | 6 | Used to terminate the trellis of the convolution coder. Set to 0. |

NOTE 1 - Integer fields are transmitted in unsigned binary format, LSB first.
NOTE 2 - A value of 0 in the HT Length field indicates a PPDU that does not include a data field, i.e. NDP.
NDP transmissions are used for sounding purposes only (see 9.31.2). The packet ends after the last HT-LTF or the HT-SIG.

The IEEE 802.11ah Task Group was established to develop solutions to support WiFi systems in the sub 1 GHz (S1G) band. A 802.11ah PHY may be required to support 1, 2, 4, 8, and 16 MHz bandwidths. Support for 1 and 2 MHz bandwidths may be mandatory in 802.11ah STAs.

Figure 3:
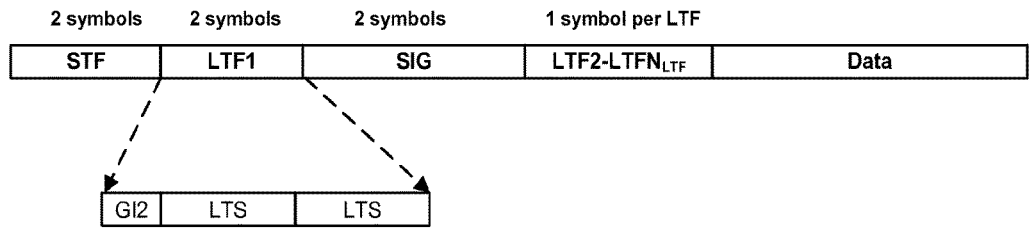
FIG. 3 depicts an example of a S1G Short format.
Figure 4:
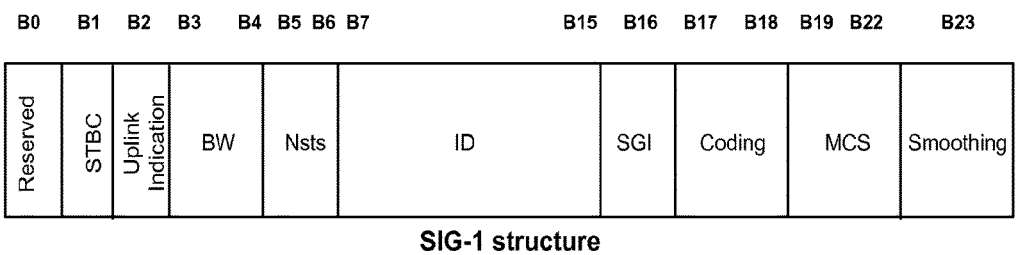
FIG. 4 depicts an example of a SIG field with S1G short format
Figure 4:
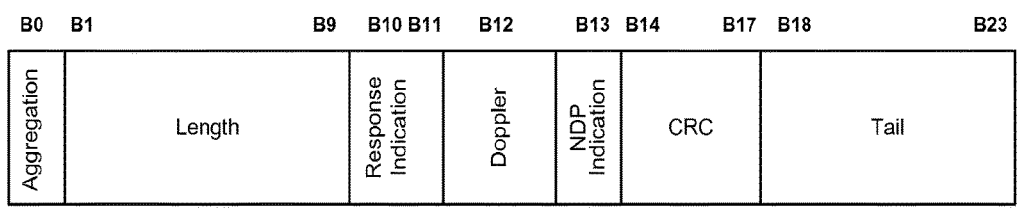

FIG. 3 illustrates an example of a S1G short format. FIG. 4 illustrates an example of a SIG field in S1G short format.

Figure 5:
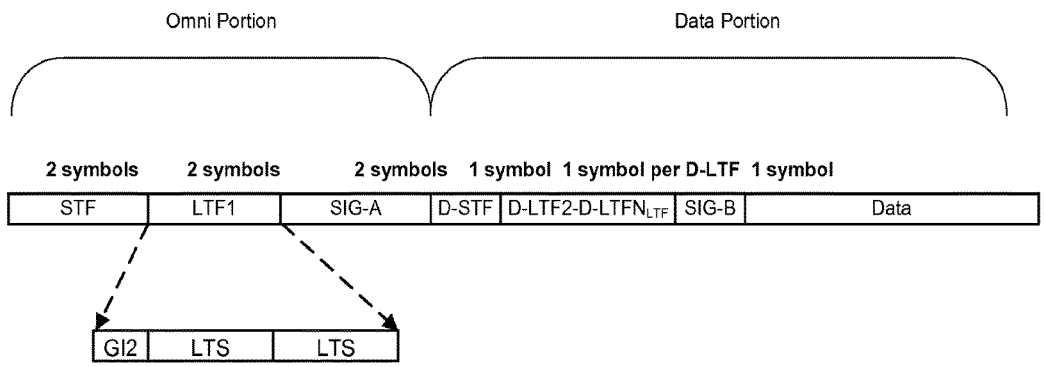
FIG. 5 depicts an example of a S1G Long format
Figure 6:
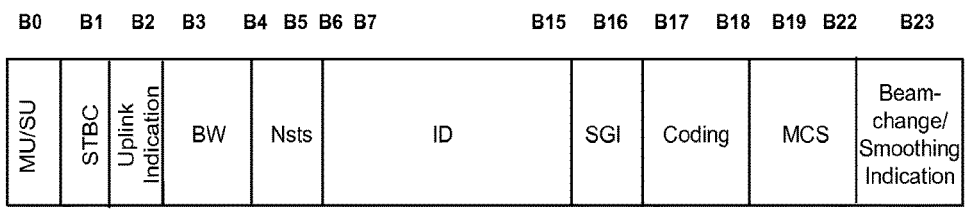
FIG. 6 depicts an example of a SIG-A field in S1G lone format. when single user transmission is utilized.
Figure 6:
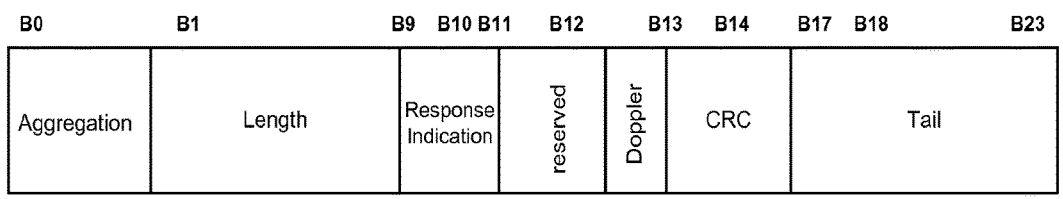
Figures 7, 8, 9:
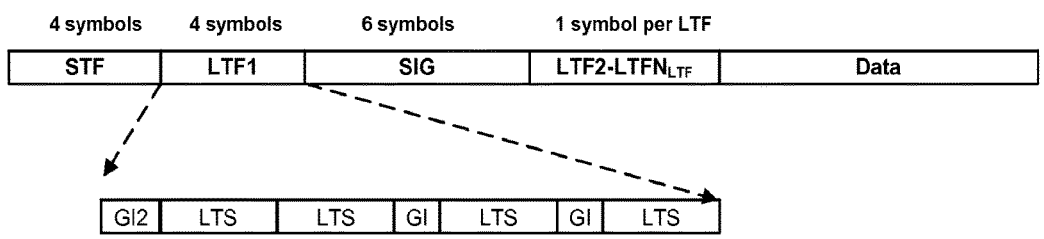
FIG. 7 depicts an example of a SIG-A field in S1G lone format when multi user transmission is utilized.
FIG. 8 depicts an example of an S1G 1M format.
FIG. 9 depicts an example of a SIG field in S1G 1M format.

FIG. 5 illustrates an example of a S1G long format PPDU. FIG. 6 illustrates an example of a SIG-A field for a single user transmission. FIG. 7 illustrates an example of a SIG-A field for a multi user transmission. Table 2 gives the SIG-B field for S1G long format.

TABLE 2

| | Bit Allocation (number of bits) | | | | |
|---|---|---|---|---|---|
| Field | 2 MHz | 4 MHz | 8 MHz | 16 MHz | Description |
| MCS | B0-B3 (4) | B0-B3 (4) | B0-B3 (4) | B0-B3 (4) | Per-user MCS in MU-MIMO |
| Reserved | B4-B11 (8) | B4-B12 (9) | B4-B14 (11) | B4-B14 (11) | All ones |

TABLE 2-continued

| Field | Bit Allocation (number of bits) | | | | Description |
|---|---|---|---|---|---|
| | 2 MHz | 4 MHz | 8 MHz | 16 MHz | |
| CRC | B12-B19 (8) | B13-B20 (8) | B15-B22 (8) | B15-B22 (8) | |
| Tail | B20-B25 (6) | B21-B26 (6) | B23-B28 (6) | B23-B28 (6) | All zeroes |
| Total # bits | 26 | 27 | 29 | 29 | |

S1G 1 MHz transmissions may be mandatory. FIG. 8 illustrates an example of a PPDU in S1G 1M format. FIG. 9 illustrates an example of a SIG field in S1G 1M format.

Figure 10:
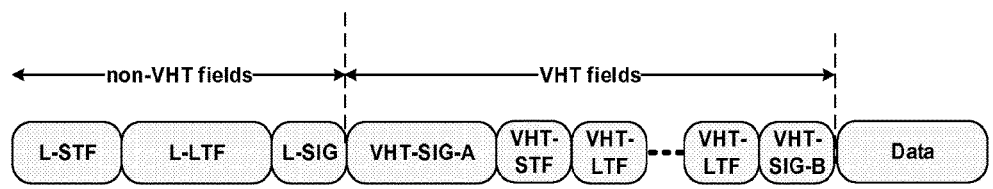
FIG. 10 depicts an example of a VHT mixed format packet in 802.11ac.

In 802.11ac, a Very High Throughput (VHT) preamble may be defined to carry required information to operate in either single-user or multi-user mode. In order to maintain backward compatibility with non-VHT STAs, specific non-VHT fields (or legacy fields) may be defined so that they can be received by non-VHT STAs (e.g., to be compliant with Clause 17 or Clause 19). The non-VHT fields may be followed by VHT fields specific to VHT STAs. FIG. 10 illustrates an example of a VHT mixed format packet of 802.11ac.

Information that may be required to interpret VHT format packets may be carried by a VHT-SIG-A field. The VHT-SIG-A field may contain the fields listed in Table 3. The VHT-SIG-A field may contain VHT-SIG-A1, containing 24 data bits, as shown in Table 3.

TABLE 3

| VHT-SIG-A1 | B0-B1 | BW | 2 | Set to 0 for 20 MHz, 1 for 40 MHz, 2 for 80 MHz, 3 for 160 MHz and 80 + 80 MHz. |
|---|---|---|---|---|
| | B2 | Reserved | 1 | Reserved. Set to 1. |
| | B3 | STBC | 1 | Set to 1 if all streams have space time block coding and set to 0 otherwise. |
| | B4-B9 | Group ID | 6 | In a SU VHT PPDU, if the PPDU carries MPDU(s) addressed to an AP or to a mesh STA, the Group ID field is set to 0, otherwise it is set to 63. In an NDP PPDU the Group ID is set according to 9.30.6 (Transmission of a VHT NDP). For a MU-MIMO PPDU the Group ID is set as in 22.3.11.3 (Group ID). |
| | B10-B21 | $N_{STS}$ | 12 | For MU: 3 bits/user with maximum of 4 users (user u uses bits B(10 + 3u) – B(12 + 3u), u = 0, 1, 2, 3). Set to 0 for 0 space time streams Set to 1 for 1 space time streams Set to 2 for 2 space time streams Set to 3 for 3 space time streams Set to 4 for 4 space time streams Values 5-7 are reserved For SU: B10-B12 Set to 0 for 1 space time streams Set to 1 for 2 space time streams Set to 2 for 3 space time streams Set to 3 for 4 space time streams Set to 4 for 5 space time streams Set to 5 for 6 space time streams Set to 6 for 7 space time streams Set to 7 for 8 space time streams B13-B21 Partial AID: Set to the value of the TXVECTOR parameter PARTIAL_AID. Partial AID provides an abbreviated indication of the intended recipient(s) of the frame (see 9.17a (Partial AID in VHT PPDUs)). |
| | B22 | TXOP_PS_NOT_ALLOWED | 1 | Set to 0 by VHT AP if it allows non-AP VHT STAs in TXOP power save mode to enter Doze state during a TXOP. Set to 1 otherwise. The bit is reserved and set to 1 in VHT PPDUs transmitted by a VHT non-AP STA. |
| | B23 | Reserved | 1 | All ones |

The VHT-SIG-A field may contain the fields listed in Table 4. The VHT-SIG-A field may contain VHT-SIG-A2, containing 24 data bits, as shown in Table 4.

TABLE 4

| VHT-SIG-A2 | B0-B1 | Short GI | 2 | B0: Set to 0 if short guard interval is not used in the Data field. Set to 1 if short guard interval is used in the Data field. |
|---|---|---|---|---|

TABLE 4-continued

| | | | |
|---|---|---|---|
| | | | B1:<br>Set to 1 if short guard interval is used and $N_{SYM}$ mod 10 = 9, otherwise set to 0. $N_{SYM}$ is defined in 22.4.3 (TXTIME and PSDU_LENGTH calculation). |
| B2-B3 | Coding | 2 | B2:<br>For SU, B2 is set to 0 for BCC, 1 for LDPC<br>For MU, if the $N_{STS}$ field for user 0 is non-zero, then B2 indicates the coding used for user 0; set to 0 for BCC and 1 for LDPC. If the $N_{STS}$ field for user 0 is set to 0, then this field is reserved and set to 1.<br>B3:<br>Set to 1 if the LDPC PPDU encoding process, or at least one LPDC user's PPDU encoding process, results in an extra OFDM symbol (or symbols) as described in 22.3.10.5.2 (LDPC coding) and 22.3.10.5.3 (Encoding process for MU transmissions). Set to 0 otherwise. |
| B4-B7 | MCS | 4 | For SU:<br>MCS index<br>For MU:<br>If the $N_{STS}$ field for user 1 is non-zero, then B4 indicates coding for user 1: set to 0 for BCC, 1 for LDPC. If $N_{STS}$ for user 1 is set to 0, then B4 is reserved and set to 1.<br>If the $N_{STS}$ field for user 2 is non-zero, then B5 indicates coding for user 2: set to 0 for BCC, 1 for LDPC. If $N_{STS}$ for user 2 is set to 0, then B5 is reserved and set to 1.<br>If the $N_{STS}$ field for user 3 is non-zero, then B6 indicates coding for user 3: set to 0 for BCC, 1 for LDPC. If $N_{STS}$ for user 3 is set to 0, then B6 is reserved and set to 1.<br>B7 is reserved and set to 1. |
| B8 | Beam formed | 1 | For SU:<br>Set to 1 if a beamforming steering matrix is applied to the waveform in an SU transmission as described in 19.3.11.11.2 (Spatial mapping), set to 0 otherwise.<br>For MU:<br>Reserved and set to 1. |
| B9 | Reserved | 1 | Reserved and set to 1. |
| B10-B17 | CRC | 8 | CRC calculated as in 19.3.9.4.4 (CRC calculation for HT-SIG) with C7 in B10, etc. |
| B18-B23 | Tail | 6 | Used to terminate the trellis of the convolutional decoder. Set to 0. |

VHT-SIG-A1 (Table 3) may be transmitted before VHT-SIG-A2 (Table 4). The VHT-SIG-A symbols may be BCC encoded at rate, R=½, interleaved, mapped to a BPSK Constellation. The short training field (STF), long training field (LTF), and SIG fields may be referred to as an omni-portion of a MU-MIMO preamble.

Information may be carried by a VHT-SIG-B field. The VHT-SIG-B field may be specific for providing MU-MIMO information to multiple simultaneous STAs. The VHT-SIG-B field may contain data bits as shown in Table 5.

TABLE 5

| Field | MU Allocation (bits) | | | SU Allocation (bits) | | | Description |
|---|---|---|---|---|---|---|---|
| | 20 MHz | 40 MHz | 80 MHz,<br>160 Hz,<br>80 + 80 MHz | 20 MHz | 40 MHz | 80 MHz,<br>160 Hz,<br>80 + 80 MHz | |
| Length | B0-B15<br>(16) | B0-B16<br>(17) | B0-B18<br>(19) | B0-B16<br>(17) | B0-B18<br>(19) | B0-B20<br>(21) | Length of useful data in PSDU in units of 4 octets |
| MCS | B16-B19<br>(4) | B17-B20<br>(4) | B19-B22<br>(4) | N/A | N/A | N/A | |

TABLE 5-continued

| | MU Allocation (bits) | | | SU Allocation (bits) | | | |
| --- | --- | --- | --- | --- | --- | --- | --- |
| Field | 20 MHz | 40 MHz | 80 MHz, 160 Hz, 80 + 80 MHz | 20 MHz | 40 MHz | 80 MHz, 160 Hz, 80 + 80 MHz | Description |
| Reserved | N/A | N/A | N/A | B17-B19 (3) | B19-B20 (2) | B21-B22 (2) | All ones |
| Tail | B20-B25 (6) | B21-B26 (6) | B23-B28 (6) | B20-B25 (6) | B21-B26 (6) | B23-B28 (6) | All zeroes |
| Total # bits | 26 | 27 | 29 | 26 | 27 | 29 | |

A group ID concept (introduced by 802.11ac) may be utilized for DL MU-MIMO transmissions to enable an AP address having a group of STAs with a single ID. Group ID is included in the VHT-SIG-A field (Table 4). The AP may use Group ID Management frames to assign a group ID to STAs. Group ID Management frames may be addressed to the individual STAs and comprise Membership Status Array and User Position Array.

Figure 11:
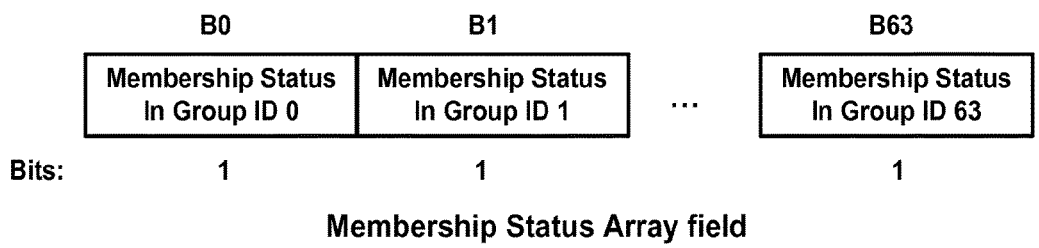
FIG. 11 depicts an example of a Membership Status Array field.

FIG. 11 illustrates an example of a Membership Status Array field.

Figure 12:
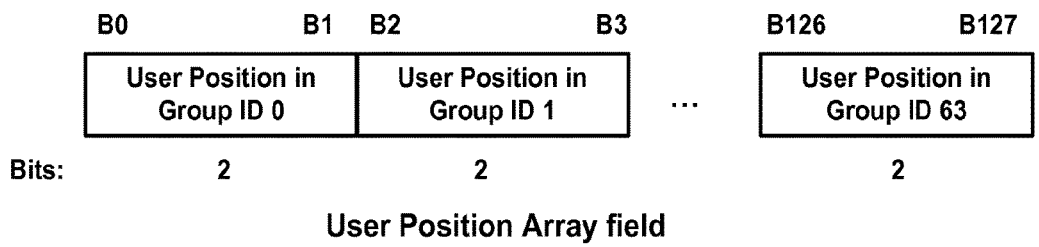
FIG. 12 depicts an example of User Position Array field.

FIG. 12 illustrates an example of a User Position Array field.

Null Data Packets (NDP) (e.g., introduced by 802.11ah) may carry simple control/management information. NDP Clear-To-Send (CTS) frame, NDP Contention-Free End (CF-End) frame, NDP Power-Save Poll (PS Poll) frame, NDP Acknowledgement (ACK) frame, NDP Block Acknowledgement (BA) frame, NDP Beamforming Report Poll frame, NDP Paging frame, and NDP Probe Request frame may be defined.

Preamble design and associated procedures for downlink and uplink multi-user simultaneous transmission are described below. WiFi systems have emphasized support for single user transmissions. 802.11ac and 802.11ah, may address improved downlink spectral efficiency by including support for Downlink Multi-User MIMO (DL MU-MIMO). Support for Uplink (UL) MU-MIMO simultaneous transmissions may be needed. Current designs for UL transmissions may (e.g., may only) consider the requirements for UL Single User (SU) MIMO. Systems and methods for use with UL MU-MIMO simultaneous transmissions may be provided.

PPDU formats which may be understood by both intended and unintended STAs, and by both legacy and non-legacy STAs, may be needed. PPDU formats which support time, spatial, and frequency resource allocation domains for MU-MIMO operation may be needed.

A Signaling field (SIG) may be required to detect and decode a packet. In 802.11ac, the SIG field may have two parts, the VHT-SIG-A (46 bits) and the VHT-SIG-B (29 bits). The VHT-SIG-A may be further sub-divided into VHT-SIG-A1 (23 bits) and VHT-SIG-A2 (23 bits). The SIG fields may provide an indication of the frame attributes (including, e.g., the channel width, MCS). The SIG fields may provide an indication of whether SU-MIMO or MU-MIMO operation is in operation. The VHT-SIG-B field may be specific for providing MU-MIMO information to multiple simultaneous STAs. An indication of the STA's Group ID may be (may also be) provided by the SIG field. A SIG field may comprise a non-trivial overhead for conveying control information to the receiver. If the SIG field is not decoded properly, it may impact the proper reception of the entire PPDU. Incorporation of PHY-based DL MU-MIMO and/or UL MU-MIMO, and associated simultaneous transmissions, may necessitate the indication of additional parameters to the receiver for proper reception. Systems, methods and/or devices which enable this indication, including the possible design of a new SIG field, may be necessary to enable these modes of operation. Given the overhead of the SIG design in 802.11, reducing this overhead, and enhancement of the detection probability for these mode of operation may be beneficial.

STF and LTF may be utilized for start of packet detection, time/frequency synchronization, and/or channel estimation. STF/LTF may be designed to better fit with simultaneous transmission implementations. Synchronization and channel estimation requirements for simultaneous transmission may be different from single user transmission, and, the STF/LTF may be re-designed.

Group IDs may be within the range [0,63], where 0/63 indicates single user transmission. Thus up to 62 multi-user groups may be supported. A group may have up to 4 users. With multiple simultaneous transmissions on both the DL and UL, and potentially multiple simultaneous transmission modes, the available number of group IDs may not be sufficient. The Group ID Management frame may be transmitted by the AP using a unicast transmission. The AP assignment of Group IDs may be done individually for a STA, one after the other, which may lead to inefficiencies which may adversely impact the network spectral efficiency. If an AP is required to create a new group of STAs, it may need to re-assign the STA's Group IDs. This may be done by transmitting a Group ID Management frame to a (e.g., each) user within the group prior to the beginning of simultaneous transmissions, which may create undesirable inefficiencies and constraints.

Pilot designs for other simultaneous transmissions, which may involve requirements for DL and UL may require the definition of pilot designs.

Multi-user simultaneous transmissions may require extra control frames to convey additional necessary signaling. The overhead of the control frames may reduce the system efficiency. NDP packets, which may include (e.g., only include) PHY header and no MAC body, may be used to further reduce the overhead of the needed control frames and may increase system efficiency.

A generic PPDU format may be provided. A PPDU may need to include legacy STF, LTF and/or SIG fields, e.g., in order to support multiple simultaneous transmission modes, and may at the same time support backward compatibility with existing IEEE 802.11 specifications.

Figure 13:
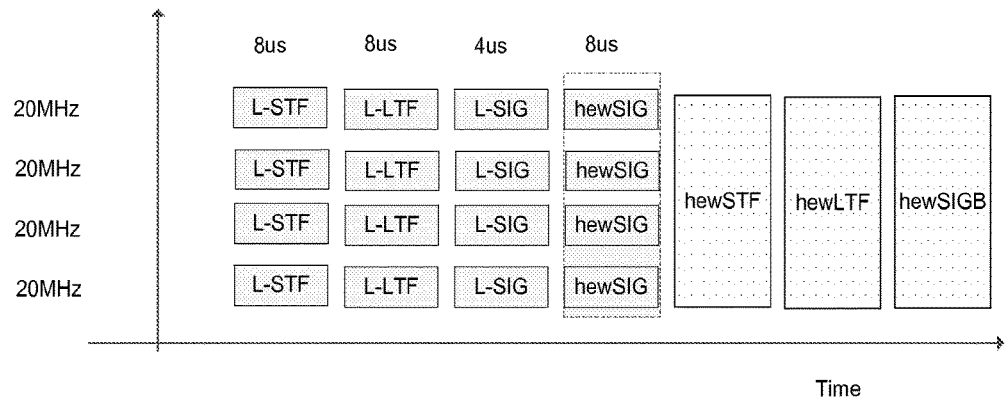
FIG. 13 depicts an example of a HEW PPDU design for simultaneous transmissions.

FIG. 13 illustrates an exemplary PPDU format design. A high efficiency SIG field (e.g., referred to herein as a hewSIG field) may be positioned in the PPDU following the L-SIG field. The L-STF, L-LTF, L-SIG and hewSIG fields may be transmitted and replicated on each 20 MHz channel. The fields may be transmitted utilizing an omni transmission antenna mode. For downlink simultaneous transmissions, when multiple antennas are utilized simultaneously at the transmitter, a cyclic shift diversity (CSD) scheme may be utilized. For uplink simultaneous transmissions, CSD may not may not be utilized.

The transmission of the fields may depend on the backward compatibility supported by the system. For example, if backward compatibility with IEEE 802.11a/g is required, the subcarrier format, sequences, and/or CSD parameters (if applied) may relate to those of 802.11ac non-VHT portion transmissions (e.g., may be identical to that of 802.11ac non-VHT portion transmissions). For example, the non-VHT portion may include a legacy portion of a preamble frame format (such as, for example, the non-VHT fields illustrated in FIG. 10). If backward compatibility with IEEE 802.11a/g is not required, and backward compatibility with 802.11ac/n is required, the subcarrier format, sequences, and CSD parameters (if applied) may be identical to those of 802.11ac VHT portion transmissions.

The hewSIG field may be transmitted in a way that enables auto-detection from existing legacy mode, HT mixed mode, and/or VHT mode PPDUs. MU mode may be included in the hewSIG field, which may indicate the detailed MU mode utilized in the packet. The MU mode may indicate SU transmissions, MU transmission with frequency division (OFDMA), MU transmission with spatial division (MU-MIMO), and/or MU transmission with time division (MU-TDMA). FIG. 13 illustrates an Bus hewSIG, however, the hewSIG field may be a different time duration.

Depending on the MU mode signaled in the hewSIG field, the hewSTF, hew LTF, and/or hewSIGB fields may have different variations. A PPDU which supports multiple simultaneous transmission modes may be a high efficiency PPDU, which may be referred to as a high efficiency WLAN (HEW) PPDU.

A HEW PPDU may be utilized, e.g., in order to support UL MU-MIMO. FIG. 13 illustrates an exemplary HEW PPDU design, where the uplink transmissions are operated on a 80 MHz channel. Other channel bandwidths and other numbers of channels may be employed. Each UL MU-MIMO STA may transmit L-STF, L-LTF, L-SIG and/or hewSIG field with a 20 MHz transmission format, and may be duplicated on each 20 MHz channels. Other channel bandwidths may be supported.

Figure 14:
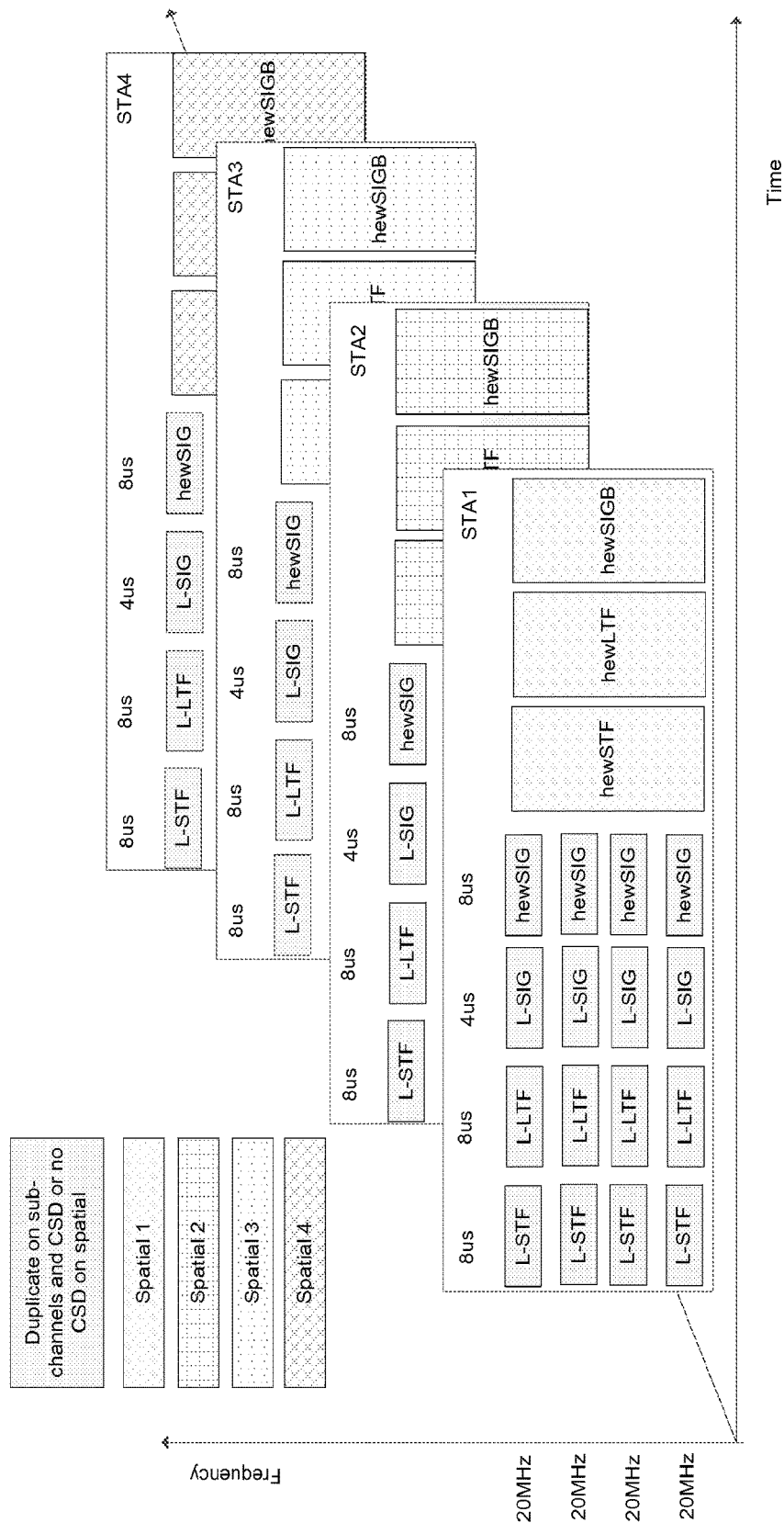
FIG. 14 depicts an example of a HEW PPDU for UL MU-MIMO.

FIG. 14 illustrates an exemplary PPDU design, which may be referred to as Design 1, where the UL MU-MIMO STAs (e.g., all the UL MU-MIMO STAs) may transmit the full sequence of L-STF and L-LTF in the sub-channels (e.g., all the sub-channels). The UL MU-MIMO STAs may transmit the full sequence of L-STF and L-LTF with Cyclic Shift Diversity (CSD) among the users. For example, the full sequence may be a complete preamble sequence that includes L-STF and L-LTF for each antenna. A signaling field, such as, for example SIG may follow. A L-SIG may carry legacy PHY layer signaling and may be the same among the UL STAs. The cyclic shift values among multiple users may be different for different types of channels. For the case that one UL MU-MIMO STA has more than one antenna, the transmissions from that STA through multiple antennas may utilize the CSD scheme and associated parameters defined for single user case. The UL MU-MIMO STAs may transmit the full sequence of L-STF and L-LTF without Cyclic Shift Diversity (CSD) among the users. The hewSIG field may be transmitted using the same set of CSD values that are utilized for L-STF and L-LTF. The hewSIG field may be the same among some (e.g., all) the UL STAs, which may comprise common information for this UL MU-MIMO transmission.

The transmitted legacy fields may not be spatially separable, but as they may be identical, they may be seen by a receiver as multipath replicas of the same signal. The HEW based fields may be spatially separable (for example, using the P-matrix on the hewLTF) to enable the receiver to decode the hew SIGB and subsequent data.

Figure 15:
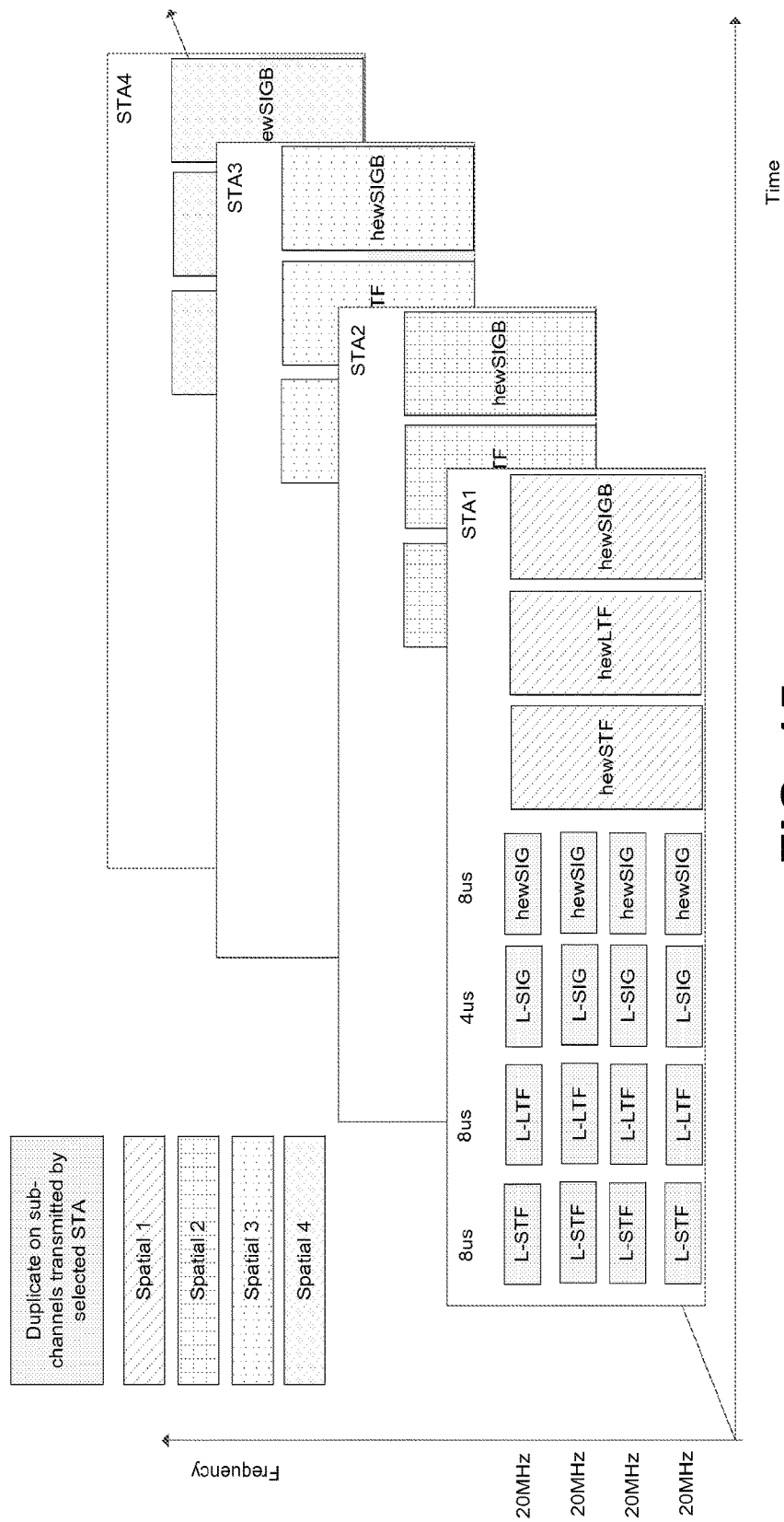
FIG. 15 depicts an example of a HEW PPDU for UL MU-MIMO.

FIG. 15 illustrates an exemplary PPDU design, which may be referred to as Design 2, where a user (e.g., only one user) may transmit L-STF, L-LTF, L-SIG, and/or the hewSIG field. The user may be the first user defined by the UL MU-MIMO group, or the AP may assign one user to transmit, such as by using a control frame prior to the UL MU-MIMO transmission. The legacy signals may be spatially separate by transmitting them from a single STA.

The transmission of L-STF, L-LTF, L-SIG and the hewSIG field may be sub-divided in the frequency domain. For example, if N users are transmitting with UL MU-MIMO, user 1 may transmit on sub-carrier index {K, K+N, K+2N, ... }, while user N may transmit on sub-carrier index {K+N−1, K+2N−1, K+3N−1, ... }.

The hewSTF/hewLTF fields may be used for multi-user synchronization and/or channel estimation. The hewSTF/hewLTF fields may be transmitted in a manner that enables the receiver (AP) to distinguish them.

Figure 16:
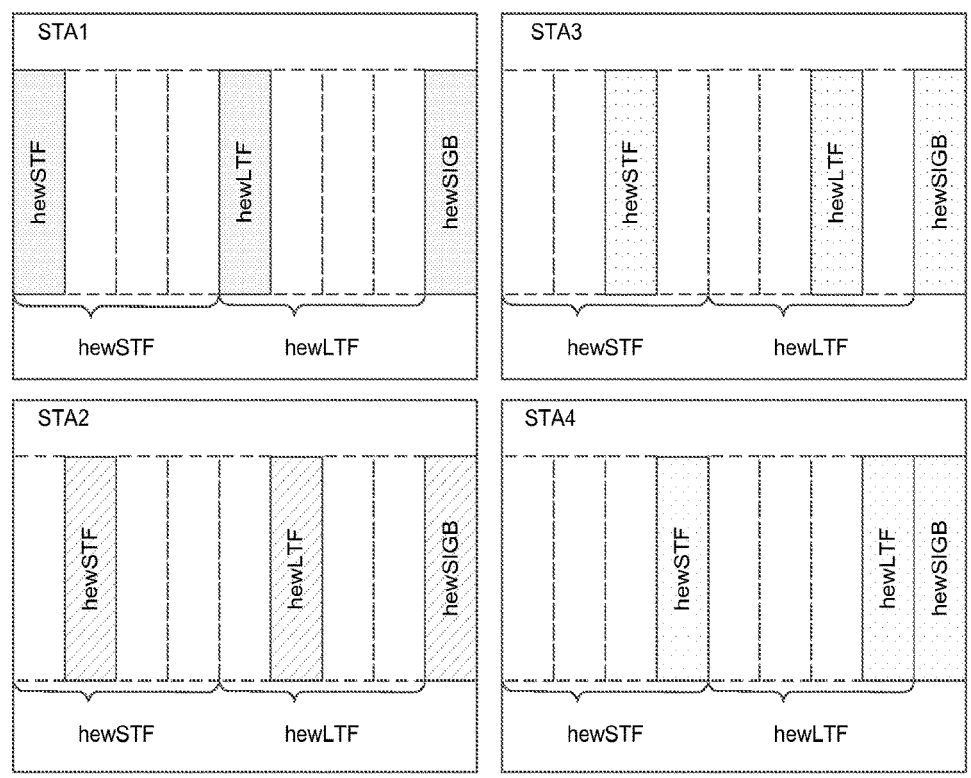
FIG. 16 depicts an example of a hewSTF/hewLTF for UL MU-MIMO.

FIG. 16 shows an exemplary hewSTF/hewLTF design for UL MU-MIMO. For example, 4 users may transmit simultaneously to the AP using UL MU-MIMO. After transmitting the legacy LTF/STF/SIG and hewSIG fields, each STA may transmit its hewSTF field. The transmitted hewSTF field duration, e.g., the number of OFDM symbols N_stf, depends on the number of UL MU-MIMO users N_user, and number of data stream for each user, N_sts.

$$N\_stf = \sum_{n=1}^{N\_user} N\_sts(n)$$

In the example of 4 users, each user may have one data stream, and there may be four OFDM symbols utilized for the hewSTF field. Each user may utilize one OFDM symbol to transmit its own hewSTF. user1/STA1 may transmit its hewSTF in the first OFDM symbol, where user2/STA2 may transmit its hew STF in the second OFDM symbol, and so on. The order of hewSTF transmission may be implicitly signaled in group ID by position field. The order of hewSTF transmission may be explicitly by other group ID mechanisms.

In the exemplary design, the hewLTFs may be transmitted using N_ltf OFDM symbols, where N_ltf is a function of number of UL MU-MIMO users, N_user, and number of data stream for each user, N_sts.

$$N\_ltf = \sum_{n=1}^{N\_user} N\_sts(n)$$

In the example of 4 users, each user may have one data stream, and there may be four OFDM symbols utilized as hewLTF field. User1/STA1 may transmit its hewLTF in the first OFDM symbol, where user2/STA2 may transmit its hew STF in the second OFDM symbol, and so on.

Figure 17:
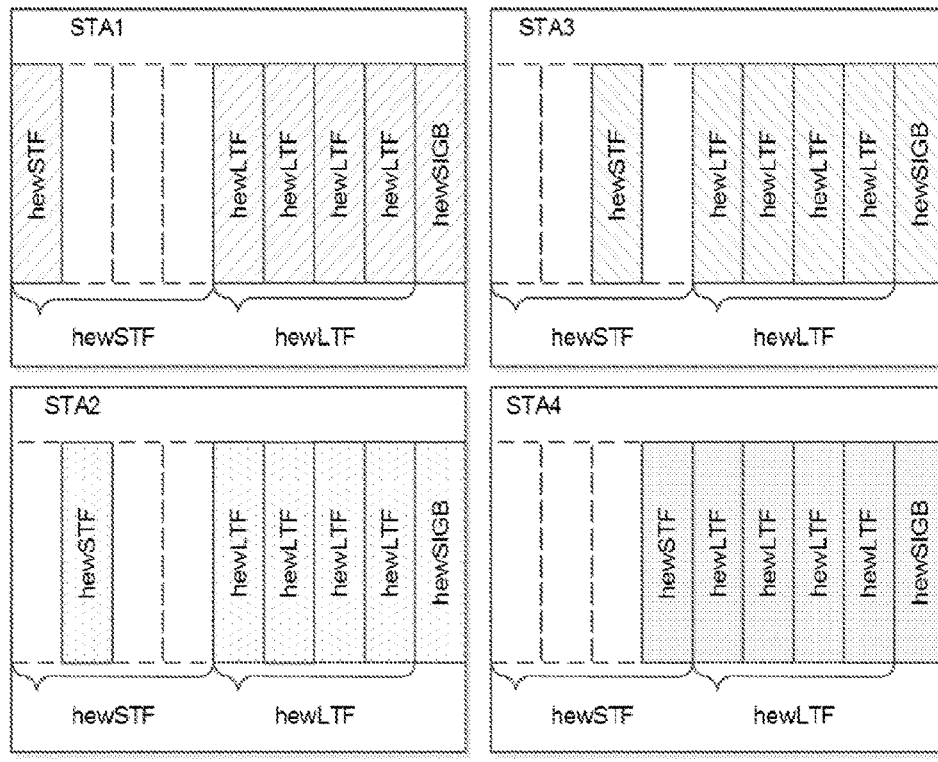
FIG. 17 depicts an example of another hewSTF/hewLTF for UL MU-MIMO.

FIG. 17 illustrates a hewSTF/hewLTF design for UL MU-MIMO. Users may transmit hewLTF signals on the OFDM symbols (e.g., all the OFDM symbols), but may modify the LTF transmission, e.g., using a P-matrix to orthogonalize the transmissions. Overlapping STFs may be used with the receiver viewing the transmission from the multiple STAs as multipath arrivals of the STF signal.

Figure 18:
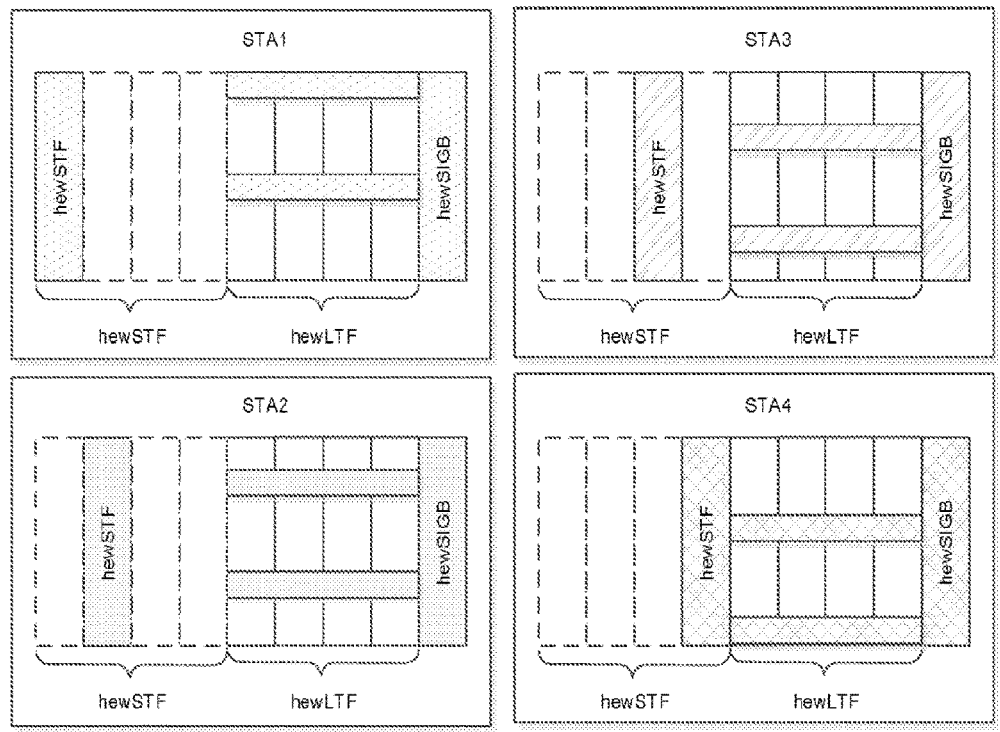
FIG. 18 depicts an example of a hewSTF/hewLTF for UL MU-MIMO.

FIG. 18 describes a design of the hewLTF. In this design, hewSTF may remain the same as above. The number of OFDM symbols that are used to transmit the hewLTF may be the same or fixed to 1,2,4,6,8 OFDM symbols. Scenarios that involve the transmission of a number of data streams not equal to one of these numbers, may use the next highest number (for example, in the case of 3/5/7 data streams from the users, 4/6/8 OFDM symbols are utilized for hewLTF respectively).

In an example with 4 users and 1 data stream, for each user there may be 4 OFDM symbols utilized for the hewLTF transmission. Different users may occupy different frequency domain subcarriers. As an example, in FIG. 18, the frequency domain channel may be partitioned to 8 sub-channels. The following allocation may be used: User1/STA1 transmits hewLTF on sub-channel 1 and 5; User2/STA2 transmits hewLTF on sub-channel 2 and 6; User3/STA3 transmits hewLTF on sub-channel 3 and 7; and User4/STA4 transmits hewLTF on sub-channel 4 and 8.

A channel may be partitioned to 4 sub-channels in a localized way or a distributed way. Each user/STA may transmit (e.g., may only transmit) a hewLTF sequence on one or some sub-channel(s). The hewLTF sequence may be defined for the entire channel. Each user/STA may follow one or more of the following to transmit the hewLTF.

The STA may use the predefined hewLTF sequence. The STA may modulate it to the frequency domain.

The STA may check the group ID and may identify its position in the group. Based on this information, the STA may apply a frequency domain filtering function on the modulated hewLTF fields. The frequency domain filtering function may be defined as follows:

$$F^n(k) = \begin{cases} 1 & k \in \text{sub\_channel}(n) \\ 0 & \text{otherwise} \end{cases}$$

where k is the subcarrier index, n is the data stream index and n=1, ..., N_ltf. In the case that each user has one data stream, n may be the same as user index. Sub_channel(n) may be a set of subcarriers which are assigned to $n^{th}$ stream for hewLTF transmission. Sub_channel(n) may be defined using following examples:

$$\text{sub\_channel}(n) = \text{data\_index}(n:N_{ltf};\text{end})$$

where data_index is the set of sub-carriers which are used for data transmission. For example, with 20 MHz transmission:

$$\text{data\_index} = \{-28: -22; -20: -8; -6: -1; 1:6; 8:20; 22: 28\}$$

A small number of sub-carriers, e.g., N_sub, may be pre-grouped together, and assigned a sub-channel based on the pre-grouped sub-carrier group. In the case that the total number of sub-carriers is not divisible by N_sub*N_ltf (for example with 20 Mhz transmission), 52 data sub-carriers (N_dc=52) are utilized. For example, in a 2 sub-carrier pre-group, if N_ltf=4, since 52 is not divisible by 8, (2*4), the last several sub-carriers may not be pre-grouped.

The sub_channel may be redefined as $$\text{sub\_channel}(n) = \\ \left\{ \text{data\_index}\left( [1:N_{sub}] + (n-1) \cdot N_{sub} : N_{sub} \cdot N_{ltf} : [1:N_{sub}] + \right.\right.\\ \left. \left( \left\lfloor \frac{N_{dc}}{N_{ltf} \cdot N_{sub}} \right\rfloor - 1 \right) \cdot N_{ltf} \cdot N_{sub} + (n-1) * N_{sub} \right); \\ \left. \text{data\_index}\left( \left\lfloor \frac{N_{dc}}{N_{ltf} \cdot N_{sub}} \right\rfloor \cdot N_{ltf} \cdot N_{sub} : N_{ltf} : \text{end} \right) \right\}$$

For example, if N_sub=2, N_ltf=4, 20 MHz transmission, then sub_channel(1)={-28,-27,-19,-18,-11,-10,-2,-1,8, 9,16,17,25} sub_channel(2)={-26,-25,-17,-16,-9,-8,1,2,10,11, 18,19,26} sub_channel(3)={-24,-23,-15,-14,-6,-5,3,4,12,13, 20,22,27} sub_channel(4)={-22,-20,-13,-12,-4,-3,5,6,14,15, 23,24,28}

The two sub_channel and data_index designs are examples.

Figure 19:
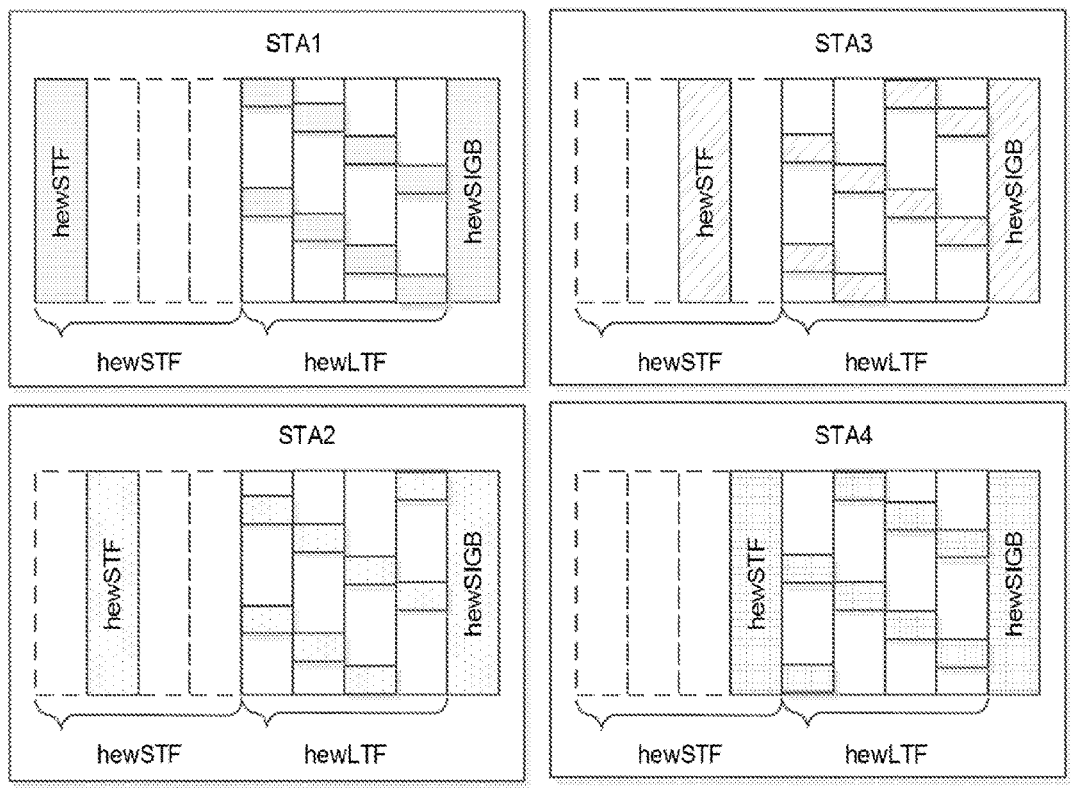
FIG. 19 depicts an example of a hewSTF/hewLTF for UL MU-MIMO.

FIG. 19 illustrates a hewSTF/hewLTF design. The hewSTF may be as described above. The hewLTF transmission may have the same number of hewLTF symbols as described with respect to FIG. 18. The frequency channel may be partitioned into multiple sub-channels, and each data stream of each STA may utilize one sub-channel. Instead of transmitting hewLTFs on the same sub-channel for the hewLTF symbols, the hewLTF of each data stream may be transmitted in a staggered way. Each user/STA may use one or more of the following to transmit the hewLTF.

The STA may use the predefined hewLTF sequence. and the STA may modulate it to frequency domain.

The STA may check the group ID and may identify its position in the group. Based on this information, the STA may apply a frequency domain filtering function on the modulated hewLTF fields. The frequency domain filtering function may be defined as follows:

$$F^n(m,k) = \begin{cases} 1 & k \in \text{sub\_channel}(m,n) \\ 0 & \text{otherwise} \end{cases}$$

Where k is the subcarrier index, n is the data stream index and n=1, ..., N_ltf. In the case that each user has one data stream, n is the same as user index. m is hewLTF symbol index, m=1, ..., N_ltf. Sub_channel(n) is a set of subcarriers which are assigned to $n^{th}$ stream for hewLTF transmission. Sub_channel(m, n) may be defined using following examples:

$$\text{sub\_channel}(m,n) = \text{data\_index}(m+n: N_{ltf};\text{end})$$

Where data_index is the set of sub-carriers which are used for data transmission. For example, with 20 MHz transmission:

$$\text{data\_index} = \{-28: -22; -20: -8; -6: -1; 1:6; 8:20; 22: 28\}$$

Or, sub_channel and data_index may use the second design discussed as for FIG. 18.

With the hewSTF/hewLTF exemplary design for UL MU-MIMO (e.g., as for FIG. 19), it may be possible to utilize a localized sub-channelization for hewLTF transmission. The sub_channel and may be designed as $$\text{sub\_channel}(m, n) = \text{data\_index}\left(\left[1 : \frac{N_{dc}}{N_{ltf}}\right] + (\text{mod}(m + n, N_{ltf}) - 2) \cdot \frac{N_{dc}}{N_{ltf}}\right)$$

For example, if N_sub=2, N_ltf=4, 20 MHz transmission (N_dc=52), then:

sub_channel(1,1)=sub_channel(2,4)=sub_channel(3,3)=sub_channel(4,2)={−28: −22;−20: −15} sub_channel(1,2)=sub_channel(2,1)=sub_channel(3,4)=sub_channel(4,3)={−14: −8;−6: −1} sub_channel(1,3)=sub_channel(2,2)=sub_channel(3,1)=sub_channel(4,4)={1:6;8:14} sub_channel(1,4)=sub_channel(2,3)=sub_channel(3,2)=sub_channel(4,1)={15:20;22:28}

Figure 20:
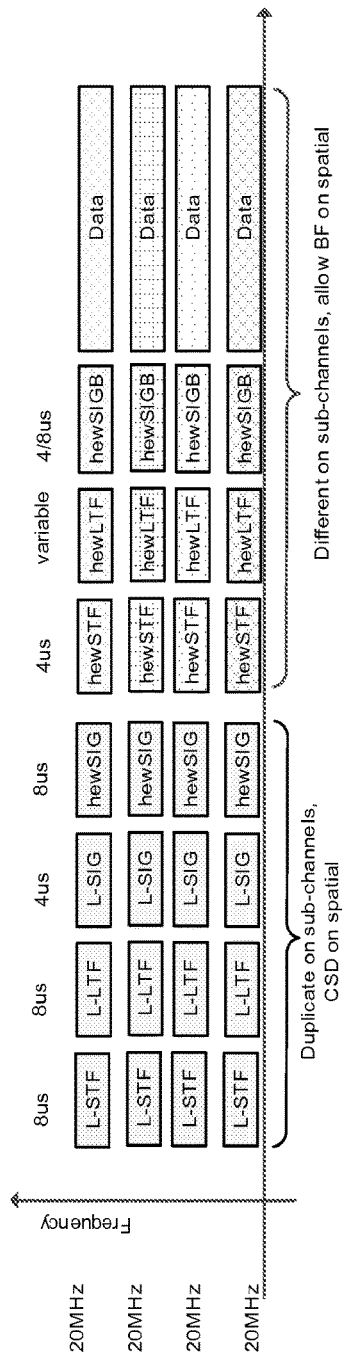
FIG. 20 depicts an example of a PPDU design for coordinated orthogonal block-based resource allocation, such as orthogonal frequency division multiple access (OFDMA) transmissions with sub-channel size greater or equal to 20 MHz (e.g., a long OFDMA PPDU).
Figure 21:
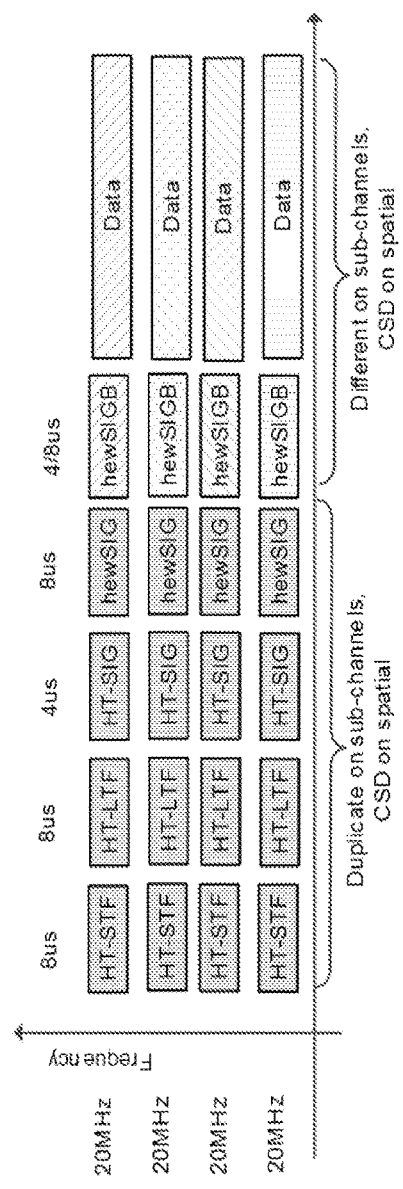
FIG. 21 depicts an example of a PPDU design for OFDMA transmissions with sub-channel size greater or equal to 20 MHz (e.g., a short OFDMA PPDU).

Turning to FIG. 20, an exemplary PPDU design for OFDMA transmissions with sub-channel size greater or equal to 20 MHz is illustrated. This PPDU format may be referred as long OFDMA PPDU. This design considers backward compatibility to 802.11a/g or supporting beamforming. These implementations may apply to both uplink and downlink OFDMA transmission. An exemplary OFDMA PPDU design may be as shown in FIG. 16 and FIG. 21. The AP may select the OFDMA PPDU frame format(s) based on the STAs' capability, whether beamforming is supported, and/or whether the system is required to be backward compatible to earlier specifications.

A long OFDMA PPDU frame format may be used when backward compatibility to 802.11a/g or beamforming support is needed and may include the legacy estimation and signaling (the L-STF, L-LTF and L-SIG). A short OFDMA PPDU frame format may be used when backward compatibility to 802.11n and no beamforming support is needed, and for example may include just the high throughput estimation and signaling (HT-STF, HT-LTF and HT-SIG).

FIG. 21 illustrates an exemplary PPDU design for OFDMA transmissions with sub-channel size grater or equal to 20 MHz. This PPDU format may a short OFDMA PPDU. This design considers backward compatibility to 802.11n and no beamforming supported.

Figure 22:
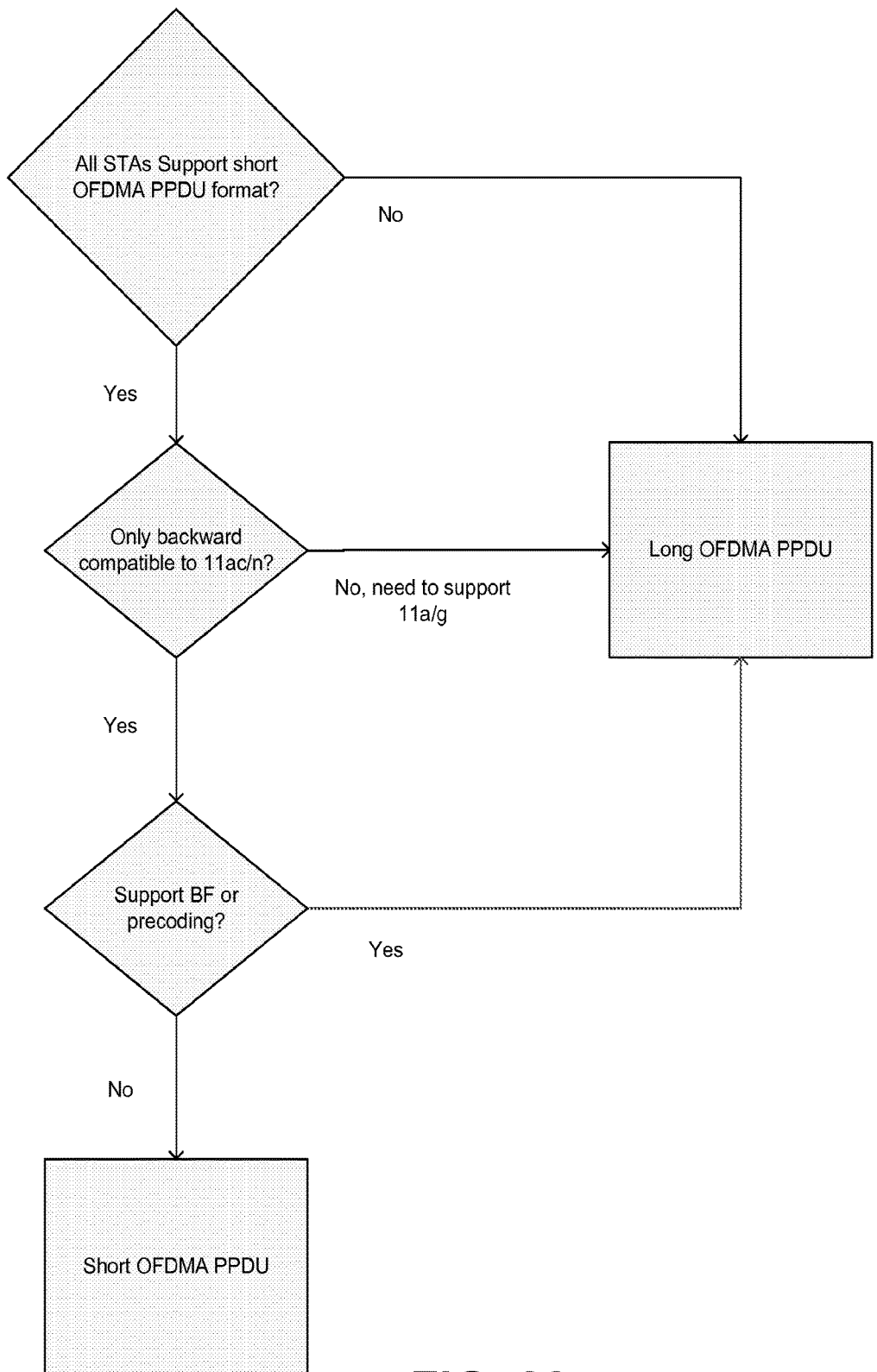
FIG. 22 depicts an example of procedures to select long/short OFDMA PPDU format.

FIG. 22 illustrates an exemplary OFDMA PPDU format selection (e.g., long/short). One or more of the following may apply.

The AP may check STA capabilities. The STAs may be STAs with which the AP is associated. The AP may check STA capabilities using a beacon (for example, the AP may not be associated with the STA). A capability of the STA to support the short OFDMA PPDU may be exchanged through association or the beacon (for example, carried in an association request frame, an association response frame, a probe response frame, a beacon frame, etc.). For example, the AP may check the STAs' capability field, which may indicate support for long and/or short OFDMA PPDU preambles. Long OFDMA PPDU may be required for the STAs (e.g., all the STAs) which support OFDMA operations. If a STA (e.g., at least one STA) involved in the upcoming DL OFDMA transmission does not support the short OFDMA PPDU, then the AP may decide to use the long preamble. If all the STAs support a short PPDU format, the short preamble may be used.

The AP may check whether the system is required to support a first generation of legacy devices, which may be 802.11a/g, and/or a second generation of legacy devices, which may be 11n/ac. The check may comprise checking an operator's capabilities. Checking an operator's capability for the system may comprise determining whether or not an AP will have capabilities which may support legacy devices. These capabilities may determine how the STAs are handled before association. If 11a/g needs to be supported (e.g., for a STA associated with the upcoming DL OFDMA transmission), the AP may select long OFDMA PPDU format.

The AP may check whether the upcoming OFDMA transmission involves any beamforming or precoding transmissions. If yes, the AP may select the long OFDMA PPDU format, otherwise, the AP may select the short OFDMA PPDU format.

In the case of UL OFDMA transmission, the AP may inform the STAs in the OFDMA transmission the PPDU format selected. For a pending UL transmission, the AP may inform the STAs of the PPDU format that should be used for the UL transmissions.

Figure 23:
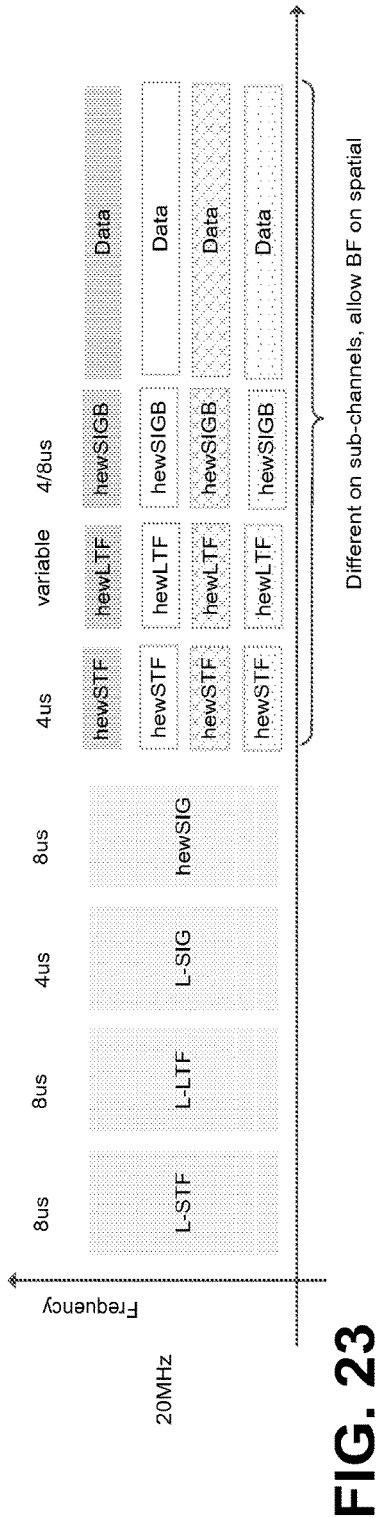
FIG. 23 depicts an example of a PPDU design for OFDMA transmissions with sub-channel size greater or equal to 20 MHz (e.g., a long OFDMA PPDU).

FIG. 23 shows an exemplary OFDMA PPDU design, e.g., using a sub-channel size that is less than 20 MHz which may be backward compatible to 802.11a/g, and may support beamforming or other precoding transmissions. With this design, the L-STF, L-LTF, L-SIG and/or hewSIG fields may be transmitted over the entire bandwidth.

These fields may be transmitted over the smallest mandatory supported bandwidth with current 802.11 standard, and repeated over the entire bandwidth. For example, if the AP is operating on 40 MHz channel, and the smallest mandatory supported bandwidth is 20 MHz, then the above mentioned fields may be transmitted over the 20 Mhz channel, and may be repeated on the second 20 Mhz channel with or without phase rotation. In the case of uplink OFDMA, the difference between the time of arrival of the transmission from the multiple STAs may be less than a guard interval (e.g., so that they appear similar to the effect of a multipath channel on a single signal). In the case of uplink OFDMA, the hewSIG may be such that it indicates a change to sub-channelized transmission with detailed signaling information moved to the hewSIGB field.

Following the hewSIG field, a set of dedicated fields may be transmitted over each sub-channel. The set of dedicated fields may include hewSTF, hewLTF, and/or hewSIGB fields. The dedicated fields may be beamformed or precoded for each user. The hewSIGB field may contain information dedicated for one user. This design may be referred as a long OFDMA PPDU format.

Figure 24:
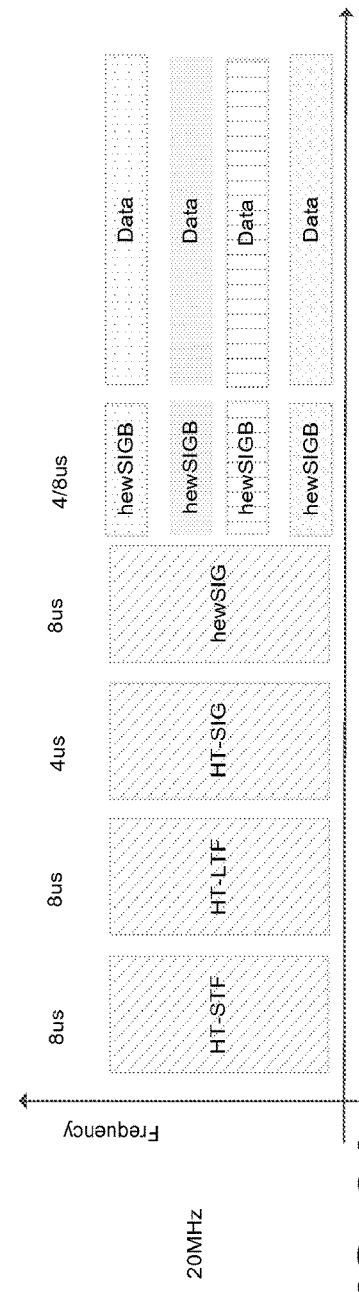
FIG. 24 depicts an example of a PPDU design for OFDMA transmissions with sub-channel size greater or equal to 20 MHz (e.g., a short OFDMA PPDU).

FIG. 24 shows an exemplary short OFDMA PPDU format, which has less preamble overhead, and, may be backward compatible to 11ac/n users (e.g., only to such users and not previous generation users) and may not support beamforming or other pre-coding schemes. This design may be a short OFDMA PPDU format. The first portion, which may be utilized to support backward compatibility to previous specifications, may include one set of the STF, LTF and SIG field, and this portion may be decodable by legacy devices (e.g., 11ac/n users). With 20 MHz and 40 MHz transmissions, this set may be associated with HT-STF, HT-LTF and HT-SIG defined in 802.11n (e.g., identical to HT-STF, HT-LTF and HT-SIG defined in 802.11n). With 80 Mhz or above transmission, these fields may be transmitted over the entire bandwidth, and may use VHT-STF, VHT-LTF and VHT-SIGB format. If these fields are transmitted on 20 MHz channel, and repeated over the entire bandwidth, then HT-STF, HT-LTF and HT-SIG format may be utilized.

The hewSIG field may be considered as part of the HEW transmission and may not be decoded by the legacy devices. However, it may be transmitted following the same waveform and subcarrier format as the LTF field transmitted before it. The hewSIG field may comprise common information for the upcoming OFDMA transmission for the users. The hewSIGB field may follow hewSIG field, and may comprise dedicated information for a OFDMA user.

Figure 25:
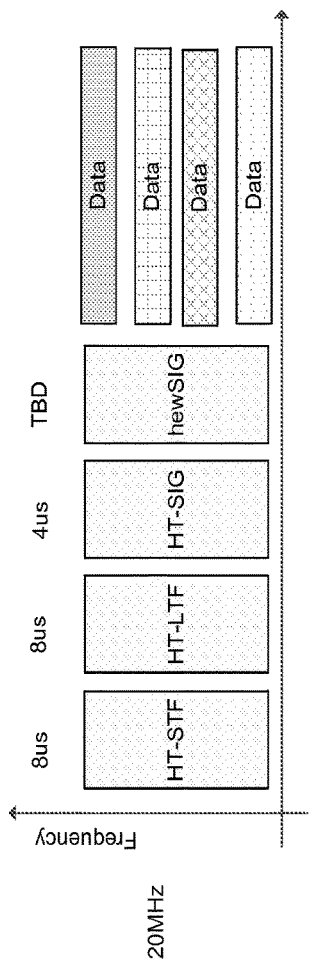
FIG. 25 depicts an example of a PPDU design for OFDMA transmissions with sub-channel size greater or equal to 20 MHz (e.g., a short OFDMA PPDU).

FIG. 25 shows a short OFDMA PPDU format. The sub-channel size may be greater or equal to 20 MHz, and may be backward compatible to 802.11ac/n, with no support of beamforming. This design is similar to that shown in FIG. 24, however, the dedicated hewSIGB field may be omitted here and the necessary information may be included in the hewSIG field. The AP may select long or short format for OFDMA transmissions. The selection may be as shown in FIG. 22.

Figure 26:
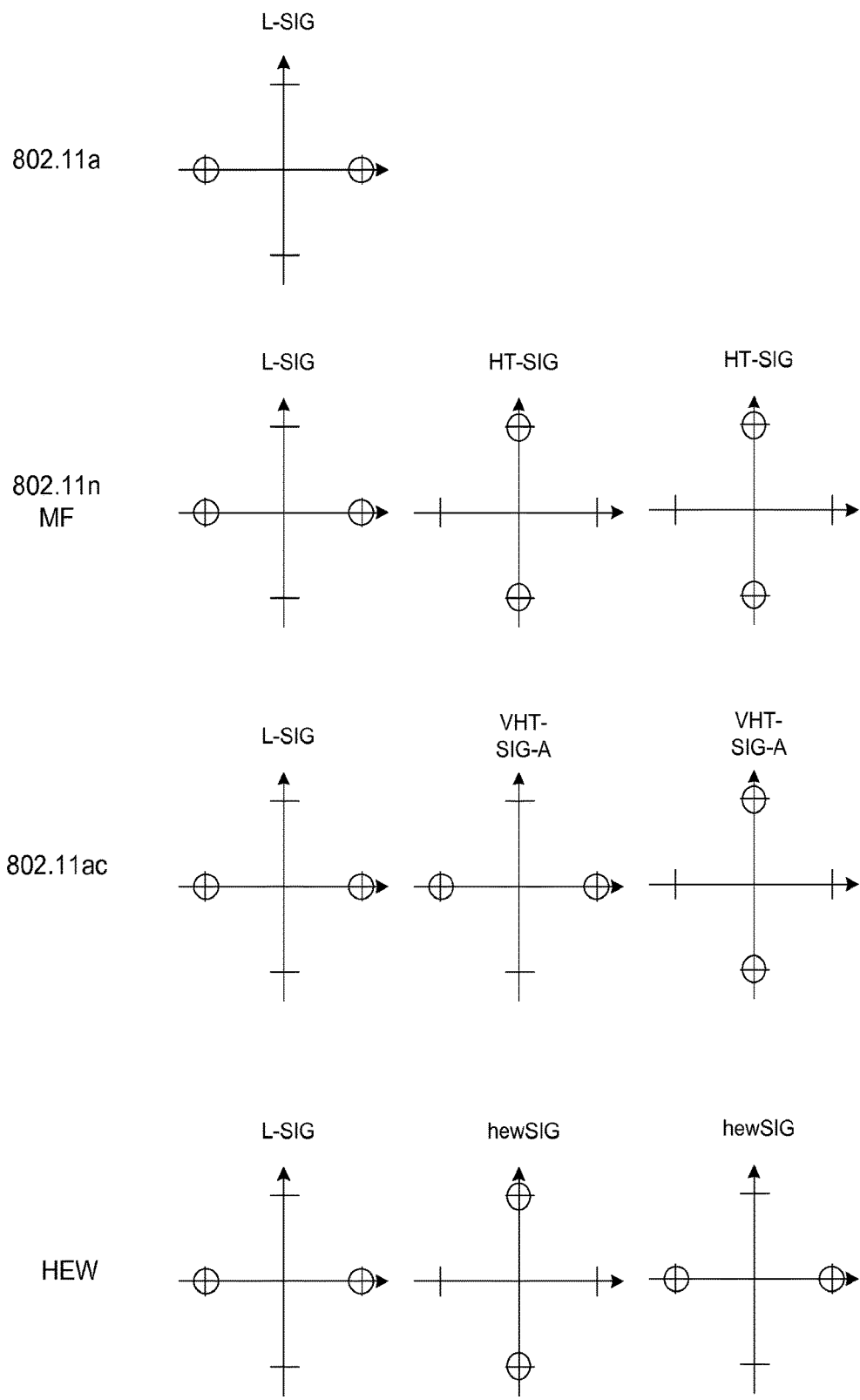
FIG. 26 depicts an example of a transmission design for hewSIG field.

FIG. 26 exemplary SIG Field transmission design for the hewSIG field where two OFDM symbols are utilized. Transmission and auto-detection of the hewSIG field may be provided. To enable auto-detection of a HEW signal, the hewSIG may comprise x OFDM symbols, the first symbol may be rotated 90 degrees relative to L-SIG, while the second symbol may be rotated 90 degrees relative to the first axSIG symbol and the rotation may continue for x OFDM symbols. This may enable auto-detection of the HEW signal and differentiation from legacy mode, HT mixed mode, and/or VHT mode preambles. If an example where hewSIG field is made up of two OFDM symbols, FIG. 26 and Table 6 show the transmission of hewSIG field, and how the auto-detection may be carried out.

For example, assuming that the BPSK signal is denoted as +1 and the rotated BPSK signal is denoted as −1, see HEW auto-detection for TABLE 6.

TABLE 6

|  | Symbol 0 | Symbol 1 | Symbol 2 |
| --- | --- | --- | --- |
| 802.11a | +1 |  |  |
| 802.11n MF | +1 | −1 | −1 |
| 802.11ac | +1 | +1 | −1 |
| 802.11ax/HEW | +1 | −1 | +1 |

The hewSIG field may be common for the transmission modes (e.g., all the transmission modes). The hewSIG field may include a new parameter which is used to indicate simultaneous transmission mode, or multi-user transmission mode, MU mode. An exemplary MU mode value is illustrated in Table 7.

TABLE 7

| Value | Definition |
| --- | --- |
| 0 | Single user transmission |
| 1 | MU-MIMO |
| 2 | OFDMA |
| 3 | MU-Time |

The hewSIG field may include one or more of the following subfields: MU mode; Group ID (e.g., Based on MU mode, different sets of group ID may be utilized. For example, if MU mode indicates OFDMA transmission, the group ID may be interpolated); Direction bit (1 bit); Bandwidth (BW) (besides 20 MHz, 40 MHz, 80 MHz, 160 MHz/80+80 MHz, more bandwidth may be supported. For example, 60 Mhz, 40 MHz+40 MHz. 3 bits); Doppler (1 bit. to support traveling pilots); or NDP indication (indicating an NDP packet (with an NDP packet, the hewSIG field may be redundant as there is no data to be transmitted)).

The hewSIG Field may have multiple sub-channels. The hewSIG field may be transmitted with the smallest mandatary channel bandwidth, and may be repeated over the entire band if the operation bandwidth is greater than the smallest mandatary bandwidth.

If the operation bandwidth is greater than the smallest mandatary bandwidth, more information may be carried on the extra bandwidth. The hewSIG field may be different from one sub-channel to another (for this purpose, sub-channel refers to the channel with the smallest mandatory bandwidth). One bit in hewSIG field transmitted via the primary sub-channel may be used to indicate that the hewSIG field of other sub-channels may comprise different information than the primary sub-channel.

The hewSIGB field may be used to carry user dedicated information such as the MCS, the interleaving method, beamforming or MIMO mode with number of space time streams, methods of feedback, etc.

Mechanisms for Group ID may be provided. Super-Group IDs for different MU modes may be provided. For example, for different MU modes, and uplink/downlink transmissions, the AP may maintain a different group. The AP may maintain separate groups for DL MU-MIMO, UL MU-MIMO, DL OFDMA, UL OFDMA, DL MU-time and UL MU-time. The super-group ID may be made up of one or more of: a Multi-user mode indicator (3-bits): DL MU-MIMO group, UL MU-MIMO group, DL OFDMA group, UL OFDMA group, DL MU-time group and/or UL MU-time group; or Group ID (6-bits): a re-use of the existing 64 bit group ID method in legacy systems. A STA may have the same group ID, but this may indicate a different group based on the specific multi-user mode.

A super-group ID may be made up of one or more of: a transmission direction bit (1-bit): uplink or downlink; a group type (3-bits): OFDMA/OFDMA based transmission, MU-MIMO based transmission, TDMA based transmission; or a Group ID (6-bits): a re-use of the existing 64 bit group ID method in legacy systems.

The super-group ID may be made up of one or more of: a multi-user mode indicator (2-bits): MU-MIMO, OFDMA, MU-Time, SU; direction bit (1-bit): DL, UL; or Group ID: a re-use of the existing 64 bit group ID method in legacy systems.

Group ID broadcast and efficient assignment may be provided. The Group ID management frame assigning uses to a group may be broadcast from the AP, with the group ID and the MAC addresses of the STAs in the new group attached. A 2-bit field may be used to indicate one or more of the following: New group, which may set up a new group; Add to group, which may add a STA(s) to the group while keeping the existing members of the group; Remove from group, which may remove a STA(s) from the group while keeping the rest of the members in the group; or Temporarily replace, which may temporarily replace a specific member of the group. The duration may be for the next x transmissions or may be forever. In this case, the member to be replaced may be indicated by an index as opposed to using its MAC address. This may enable transmission to a different STA in the case that one member of the group does not have any data to transmit. The STAs that are listed may be added or removed from the group more efficiently.

For downlink transmission, the AP may reuse the existing pilots format. With MU-MIMO transmission mode, the AP may precode the pilots in the same way as it precodes the data carriers. With DL OFDMA transmissions, the STA, as a receiver, may use pilots of the entire band (e.g., not only the pilots in its dedicated sub-channel(s)) to perform phase tracking. With UL MU-MIMO, the pilots may be designed in an orthogonal way, such that the AP may distinguish pilots for each user easily. With UL OFDMA, designs may accommodate each STA to have enough pilots for phase tracking (particularly when small sub-channel size, such as 10 MHz or 5 MHz, is utilized).

UL OFDMA transmissions may utilize traveling pilots (e.g., the pilot position is permuted when the OFDM symbol index is varied). The permutation function of traveling pilots may remain the same or vary among multiple sub-channels. The system may use time varying orthogonal pilot patterns in which the pilot position does not change but the pilot symbols change over time.

The pilot positions may stay static, but the system may allow a (e.g., each) UL OFDMA user to transmit pilots over the entire bandwidth, but not limited to its own sub-channel(s). In order for the receiver (the AP) to distinguish the pilots from different users, the pilots may be transmitted in an orthogonal way. A set of orthogonal sequences may be defined and a user assigned a sequence.

In dense networks, with Overlapping BSSs, the transmissions of pilots in one BSS may adversely affect (may cause interference) in other BSSs. Cross AP pilot designs may be used in which the Pilot position of one AP is set to avoid the pilot position of another AP. Modifying the pilot symbol energy relative to data symbol energy may help mitigate the effect of inter-AP pilot interference.

NDP designs for MU control frames may be provided. For UL multi-user simultaneous transmissions, the AP may need to poll multiple stations and schedule the uplink transmission, thus there may be extra frame exchanges before the real UL MU transmissions. A set of defined NDP frames that may be utilized for MU control frames may be provided.

Figure 27:
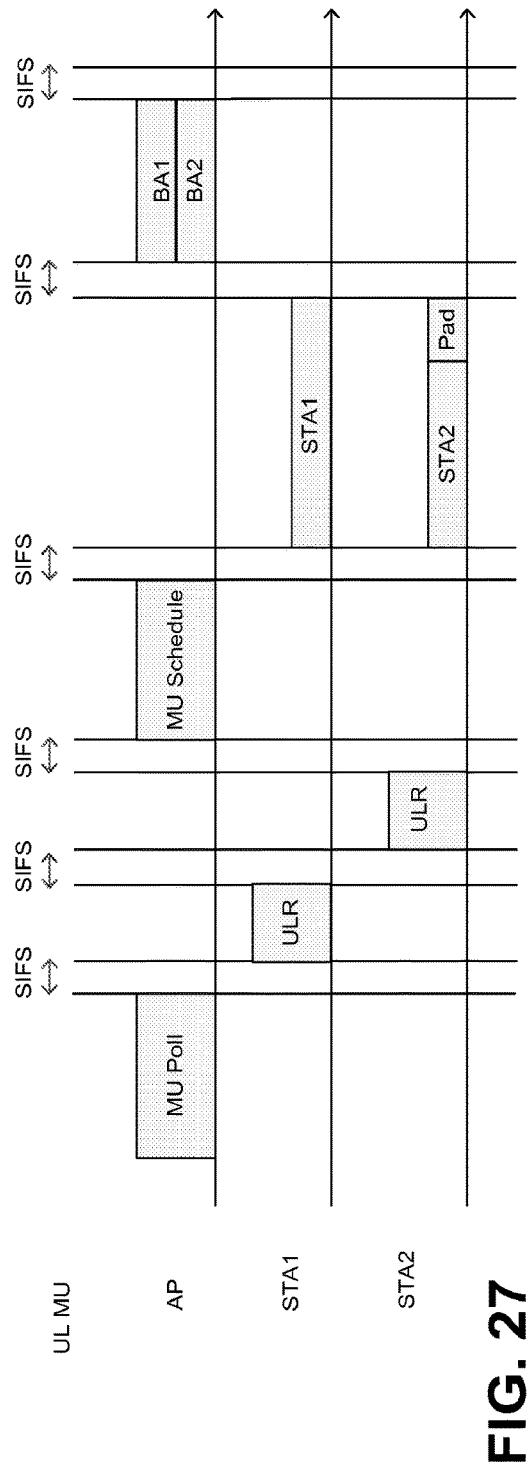
FIG. 27 depicts an example of an uplink multi-user (MU) channel access scheme.

FIG. 27 shows an exemplary uplink MU channel access. In this example, MU poll frame, uplink response frame (ULR), and MU schedule frame are introduced for MU transmissions. NDP frame formats for these frames may be provided. For example, one or more of the following fields may be added to the NDP frames: Direction (1-bit) indicating direction of the transmission; MU-mode (2-bits or 3-bits) indicating the multi-user transmission type such as DL MU-MIMO group, UL MU-MIMO group, DL OFDMA group, UL OFDMA group, DL MU-time group and/or UL MU-time group (if a direction bit is incorporated, a 2-bit MU-mode may be utilized, otherwise, 3-bit MU-mode may be utilized); Group ID (6-bits): field that indicates the sub-group ID; or NDP type: field that indicates the type of NDP transmission; NDP MU Poll; NDP MU Response Frame; and NDP MU Schedule Frame.

Although features and elements are described above in particular combinations, one of ordinary skill in the art will appreciate that each feature or element may be used alone or in any combination with the other features and elements. Other than the 802.11 protocols described herein, the features and elements described herein may be applicable to other wireless systems. Although the features and elements described herein may have been described for uplink operation, the methods and procedures may be applied to downlink operation. Although SIFS may have been used herein to indicate various inter frame spacing, other inter frame spacing, e.g., RIFS or other agreed time interval may be applied.

In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, optical media such as CD-ROM disks, and digital versatile disks (DVDs). A processor in association with software may be used to implement a radio frequency transceiver for use in a WTRU, WTRU, terminal, base station, RNC, or any host computer.

What is claimed:

1. A mobile station comprising:
   a processor; and
   a transmitter
   the processor configured to determine a number of symbols utilized for high efficiency (HE) long training field (LTF) based on a number of space-time streams associated with a HE wireless local area network (WLAN) communication,
   wherein the number of space-times streams is at least two,
   wherein, on a condition that the number of space-time streams is equal to 2, 4, 6, or 8, the processor determines the number of symbols is equal to the number of space-time streams,
   wherein, on a condition that the number of space-time streams is not equal to 2, 4, 6, or 8, the processor determines the number of symbols is a next higher number than the number of space-time streams,
   the transmitter configured to transmit the HE LTF communication using a set of subcarriers associated with the number of space-time streams.

2. The station of claim 1, wherein the number of space-time streams is a total number of space-time streams for multi-user multiple-input multiple-output (MU MIMO) users.

3. The station of claim 1, wherein the processor is further configured to determine a group identifier and identify a position of a device in a group associated with the group identifier.

4. The station of claim 1, wherein the HE LTF communication is part of a HE physical protocol data unit (PPDU).

5. A method comprising:
   determining, by a mobile station, a number of symbols utilized for high efficiency (HE) long training field (LTF) based on space-time streams associated with a HE wireless local area network (WLAN) communication,
   wherein the number of space-times streams is at least two,
   wherein, on a condition that the number of space-time streams is equal to 2, 4, 6, or 8, the processor determines the number of symbols is equal to the number of space-time streams,
   wherein, on a condition that the number of space-time streams is not equal to 2, 4, 6, or 8, the processor determines the number of symbols is a next higher number than the number of space-time streams, and
   transmitting, by the mobile station, the HE LTF communication using a set of subcarriers associated with the number of space-time streams.

6. The method of claim 5, wherein the number of space-time streams is a total number of space-time streams for multi-user multiple-input multiple-output (MU MIMO) users.

7. The method of claim 5, further comprising determining a group identifier and identifying a position of a device in a group associated with the group identifier.

8. The method of claim 5, wherein the HE LTF communication is part of a HE physical protocol data unit (PPDU).

* * * * *